(12) United States Patent
Ichikawa et al.

(10) Patent No.: US 7,209,338 B2
(45) Date of Patent: Apr. 24, 2007

(54) ACTIVE VIBRATION INSULATOR

(75) Inventors: Hiroyuki Ichikawa, Kani (JP); Takehiko Fushimi, Kariya (JP)

(73) Assignees: Tokai Rubber Industries, Ltd, Komaki-shi (JP); Aisin Seiki Kabushiki Kaisha, Kariya-shi (JP)

( * ) Notice: Subject to any disclaimer, the term of this patent is extended or adjusted under 35 U.S.C. 154(b) by 121 days.

(21) Appl. No.: 11/190,170

(22) Filed: Jul. 27, 2005

(65) Prior Publication Data

US 2006/0023388 A1    Feb. 2, 2006

(30) Foreign Application Priority Data

Jul. 30, 2004    (JP)    ............................. 2004-222905

(51) Int. Cl.
*H01H 47/00*    (2006.01)
(52) U.S. Cl. ...................................... 361/139; 361/152
(58) Field of Classification Search ................. 361/139
See application file for complete search history.

(56) References Cited

U.S. PATENT DOCUMENTS

| | | | |
|---|---|---|---|
| 6,249,418 B1 * | 6/2001 | Bergstrom ................... | 361/152 |
| 6,678,177 B2 * | 1/2004 | Asano et al. .................. | 363/93 |
| 2006/0023388 A1 | 7/2005 | Ichikawa et al. ............ | 361/139 |

FOREIGN PATENT DOCUMENTS

| | | |
|---|---|---|
| JP | 11-223237 | 8/1999 |
| JP | 11-259147 | 9/1999 |
| JP | 2001-117644 | 4/2001 |
| JP | 2003-195950 | 7/2003 |
| JP | 2003-202902 | 7/2003 |
| JP | 2004-36754 | 2/2004 |

OTHER PUBLICATIONS

U.S. Appl. No. 11/317,049, filed Dec. 27, 2005, Yasuda et al.

* cited by examiner

*Primary Examiner*—Stephen W. Jackson
*Assistant Examiner*—Luis E. Román
(74) *Attorney, Agent, or Firm*—Oblon, Spivak, McClelland, Maier & Neustadt, P.C.

(57) ABSTRACT

An active vibration insulator includes an electromagnetic actuator, a cyclic-control-signals output device, and an electromagnetic-actuator driver. The electromagnetic-actuator driver includes an asymmetric half-bridge circuit, and an actuating-signals output device. The actuating-signal output device outputs a signal for turning on one of a high-side switch and a low-side switch of the asymmetric half-bridge circuit, and outputs a pulse-width-modulated actuating signal for actuating the other one of them by means of pulse-width modulation based on the cyclic control signals, which the cyclic-control-signals output device outputs, or outputs a pulse-width-modulated actuating signal for actuating both of them by means of pulse-width modulation when the cyclic control signals are positive. Moreover, the actuating-signal output device outputs a signal for turning off one of them, and outputs a pulse-width-modulated actuating signal for actuating the other one of them by means of pulse-width modulation when the cyclic control signals are negative.

7 Claims, 13 Drawing Sheets

ACTIVE VIBRATION INSULATOR

BACKGROUND OF THE INVENTION

1. Field of the Invention

The present invention relates to an active vibration insulator, especially, an active vibration controller for actively inhibiting the vibrations of vibration generating sources, such as vehicle engines, from transmitting.

2. Description of the Related Art

Japanese Unexamined Patent Publication (KOKAI) No. 2001-117,644, for example, discloses a conventional active vibration insulator which is equipped with an electromagnet. The electromagnet is disposed inside a so-called engine mount, and generates vibrating forces to inhibit the vibrations of engines from transmitting. Specifically, the vibrations of engines are inhibited from transmitting by controlling the turning on and off of electric supply to the electromagnet depending on the vibrations of engines.

However, the conventional active vibration insulator might possibly generate abnormal noises when turned-on electricity supply to the electromagnet is turned off.

SUMMARY OF THE INVENTION

The present invention has been developed in view of the aforementioned circumstance. It is therefore an object of the present invention to provide an active vibration insulator which can suppress the generation of abnormal noises, for instance, by inhibiting turned-on electricity supply to electromagnetic actuators, such as electromagnets, from being turned off.

An active vibration insulator according to the present invention comprises an electromagnetic actuator for generating vibrating forces by making an electric-current supply variable; means for generating cyclic control signals based on cyclic pulsating signals output from a vibration generating source of a vehicle, the cyclic control signals actively inhibiting a specific part of the vehicle from vibrating; and means for driving the electromagnetic actuator by making the electric-current supply to the electromagnetic actuator variable based on the cyclic control signals.

One of the present active vibration insulator's characteristic arrangements is the electromagnetic-actuator-driving means comprising an asymmetric half-bridge circuit and means for outputting actuating signals. Note herein that the asymmetric half-bridge circuit is a circuit which comprises a high-side switch connected with a positive-terminal side of the electromagnetic actuator, and a low-side switch connected with a negative-terminal side of the electromagnetic actuator and disposed asymmetrically with respect to the high-side switch. For example, the asymmetric half-bridge circuit can be an H-bridge circuit. The H-bridge circuit is a circuit which comprises paired arms, a high-side switch disposed on an upper side of one of the paired arms, and a low-side switch disposed on a lower side of the other one of the paired arms. Moreover, the H-bridge circuit further comprises diodes, one of which is disposed on a lower side of the one of the paired arms and another one of which is disposed on an upper side of the other one of the paired arms, so as to flow an electric current in the paired arms only when adversely flowing (or regenerating) the electric current in the H-bridge circuit. In addition, an electric current is flowed to the electromagnetic actuator by turning on or off the high-side switch and the low-side switch.

Moreover, the actuating-signals outputting means outputs actuating signals, which differ from each other when the cyclic control signals are positive or negative, respectively. Specifically, the actuating-signals outputting means outputs a turn-on actuating signal to one of the high-side switch and the low-side switch, and outputs a pulse-width-modulated (hereinafter abbreviated to as "PWM") actuating signal to the other one of them based on the cyclic control signals when the cyclic control signals are positive. Alternatively, the actuating-signals outputting means outputs a PWM actuating signal to both of the high-side switch and the low-side switch based on the cyclic control signals when the cyclic control signals are positive. On the other hand, the actuating-signals outputting means outputs a turn-off actuating signal to one of the high-side switch and the low-side switch, and outputs a PWM actuating signal to the other one of them based on the cyclic control signals when the cyclic control signals are negative.

That is, the actuating-signals outputting means operates so as to increase an electric current flowing to the electromagnetic actuator when the cyclic control signals are positive. On the other hand, the actuating-signals outputting means operates so as to decrease an electric current flowing to the electromagnetic actuator when the cyclic control signals are negative.

The present active vibration insulator turns off one of the high-side switch and the low-side switch, and actuates the other one of them with a PWM actuating signal based on the cyclic control signals. When both high-side switch and low-side switch are turned off, an electric current flowing to the electromagnetic actuator might possibly decrease rapidly so that the electric-current value might equal to zero. However, when one of the high-side switch and the low-side switch is turned off and the other one of them is actuated with a PWM actuating signal as the present active vibration insulator carries out, an electric current flowing to the electromagnetic actuator decreases with a reduced decrement rate. Therefore, it is possible to control the electromagnetic actuator without letting the value of electric current flowing to the electromagnetic actuator equal to zero. Accordingly, the present active vibration insulator can inhibit the turned-on electricity supply to the electromagnetic actuator from being turned off. Consequently, the present active vibration insulator can suppress the generation of abnormal noises.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
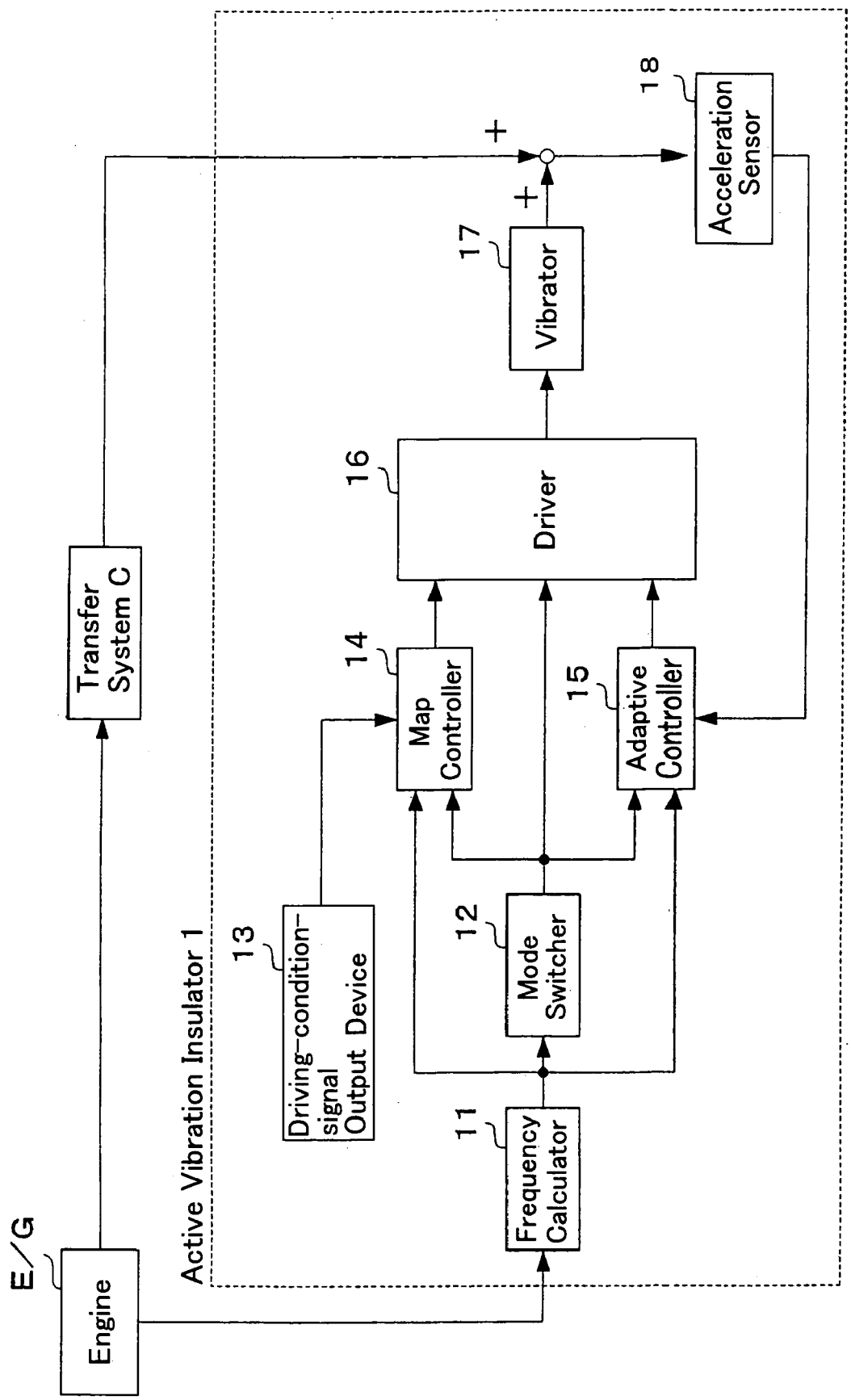
FIG. 1 is a schematic diagram for illustrating an overall arrangement of an active vibration insulator 1 according to an example of the present invention.

Having generally described the present invention, a further understanding can be obtained by reference to the specific preferred embodiments which are provided herein for the purpose of illustration only and not intended to limit the scope of the appended claims.

The present invention will be hereinafter described in detail while naming its specific embodiments. As described above, the present active vibration insulator comprises the electromagnetic actuator, the control-signals generating means, and the driving means.

(1) Cyclic Control Signals

Note that the cyclic control signals, which the control-signals generating means generates, can preferably be different from each other between the cases, where the frequencies of the cyclic pulsating signals are a predetermined frequency or less, and where the frequencies of the cyclic pulsating signals are higher than the predetermined frequency. Specifically, the cyclic control signals can preferably comprise a low-frequency control signal, which is produced by synthesizing a primary frequency component and a higher-order frequency component with respect to the frequencies of the cyclic pulsating signals, when the frequencies of the cyclic pulsating signals are a predetermined frequency or less. Moreover, the cyclic control signals can preferably comprise a high-frequency control signal, which is composed of the primary frequency component alone, when the frequencies of the cyclic pulsating signals are higher than the predetermined frequency.

The present invention will be hereinafter described with reference to an example in which the present active vibration insulator is applied to inhibit the vibrations resulting from an engine from transmitting. Even when the present active vibration insulator is applied to only inhibit a primary frequency component of the vibrations resulting from an engine from transmitting, a higher-order frequency of the vibrations resulting from an engine, a vibration generating source, might coincide with the natural frequency of an engine frame. If such is the case, the engine frame might resonate to the higher-order frequency of the vibrations resulting from the engine to eventually vibrate considerably. Consequently, it is preferable to set up the cyclic control signals by taking not only a primary frequency of the vibrations of an engine but also a higher-order frequency of the vibrations into consideration. That is, when the cyclic control signals are set up by taking a higher-order frequency of the vibrations of an engine into consideration as well, it is possible to inhibit the higher-order frequency vibration from transmitting. Thus, even when a higher-order frequency of the vibrations of an engine coincides with the natural frequency of an engine frame, it is possible to inhibit the engine frame from vibrating considerably. However, when a primary frequency component of the vibrations of an engine is higher than the natural frequency of an engine frame, the engine frame does not resonate to a higher-order frequency of the vibrations of the engine at all. Therefore, in the aforementioned preferable instance, the predetermined frequency, at which the low-frequency control signal is switched from the high-frequency control signal or vice versa, can be frequencies of the cyclic pulsating signals at which secondary frequency components of the cyclic pulsating signal's frequencies are higher than the natural frequency of an engine frame. Specifically, the predetermined frequency can be higher than 50 Hz, for example, when the natural frequency of an engine frame is 100 Hz.

Further, the primary frequency component of the low-frequency control signal can preferably comprise a sine-wave signal. That is, the primary frequency component of the low-frequency control signal, a sine-wave signal, has the virtually same waveform as those of primary frequency components of the vibrations of actual engines. Thus, the present active vibration insulator can more appropriately inhibit the vibrations resulting from a vibration generating source, such as engines, from transmitting. As a result, the present active vibration insulator can produce remarkably high quietness.

Furthermore, the primary frequency component of the low-frequency control signal can preferably comprise a rectangle-shaped wave signal, which is calculated based on a sine-wave signal. When the primary frequency component of the low-frequency control signal comprises a rectangle-shaped wave signal, it is possible to enhance the primary frequency component's ability of inhibiting vibrations from transmitting. Moreover, when the primary frequency component of the low-frequency control signal comprises a rectangle-shaped wave signal, it is possible to upgrade the response of the present active vibration insulator. In other words, even when using slow-response electromagnetic actuators, the present active vibration insulator can securely inhibit the vibrations resulting from a vibration generating source, such as engines, from transmitting.

In addition, the high-frequency control signal can preferably comprise a rectangle-shaped wave signal, which is calculated based on the primary frequency component. In a region where the frequencies of vibrations resulting from a vibration generating source, such as engines, are high, the electromagnetic actuator are required to exhibit high response. Accordingly, the high-frequency control signal comprising a rectangle-shaped wave signal can enhance the response of the electromagnetic actuator. Consequently, the present active vibration insulator can securely inhibit vibrations from transmitting in high-frequency regions.

(2) Actuating-signals Outputting Means

As described above, the actuating-signals outputting means actuates the high-side and low-side switches of the asymmetric half-bridge circuit differently depending on whether the cyclic control signals are negative or positive. Note herein that the actuating-signals outputting means can further actuate the high-side and low-side switches of the asymmetric half-bridge circuit differently depending on whether the frequencies of the cyclic pulsating signals are a predetermined frequency or less, or whether they are higher than the predetermined frequency.

Specifically, the actuating-signals outputting means can preferably output a turn-off actuating signal to one of the high-side switch and the low-side switch and can preferably output a PWM actuating signal to the other one of them based on the cyclic controls signals when the cyclic control signals are negative and the frequencies of the cyclic pulsating signals are a predetermined frequency or less. On the other hand, the actuating-signals outputting means can preferably output a turn-off actuating signal to the high-side switch and the low-side switch when the cyclic control signals are negative and the frequencies of the cyclic pulsating signals are higher than the predetermined frequency.

That is, when the cyclic control signals are negative, only if the frequencies of the cyclic pulsating signals are a predetermined frequency or less, the present active vibration insulator turns off one of the high-side and low-side switches, and actuates the other one of them by means of pulse-width modulation. When one of the high-side and low-side switches is thus turned off and the other one of them is thus actuated by means of pulse-width modulation, an electric current flowing to the electromagnetic actuator decreases with a reduced decrement rate. Therefore, the present active vibration insulator can control the electromagnetic actuator without letting the value of electric current flowing to the electromagnetic actuator equal to zero. Accordingly, the present active vibration insulator can inhibit the turned-on electricity supply to the electromagnetic actuator from being turned off. Consequently, the present active vibration insulator can suppress the generation of abnormal noises.

On the other hand, when the frequencies of the cyclic pulsating signals are higher than the predetermined frequency, the present active vibration insulator turns off both high-side and low-side switches. As the frequencies of the cyclic pulsating signals increase, the noises resulting from engines enlarge. Accordingly, when the frequencies of cyclic pulsating signals are high, it does not matter so much if noises generate when the turned-on electricity supply to the electromagnetic actuator is turned off. Consequently, when the frequencies of the cyclic pulsating signals are higher than the predetermined frequency, the present active vibration insulator turns off both high-side and low-side switches in order to make the control for the high-side and low-side switches easier.

(3) Control-signals Generating Means

The cyclic-control-signals generating means generates cyclic control signals based on cyclic pulsating signals output from a vibration generating source of a vehicle, as described above, cyclic control signals which actively inhibit a specific part of the vehicle from vibrating. The cyclic-control-signals generating means can generate the cyclic control signals differently depending on whether the frequencies of the cyclic pulsating signals are a predetermined frequency or less, or are higher than the predetermined frequency.

Specifically, the cyclic-control-signals generating means can preferably calculate the cyclic control signals based a data map stored in advance and driving conditions of the vehicle under vibration control when the frequencies of the cyclic pulsating signals are a predetermined frequency or less. On the other hand, the cyclic-control-signals generating means can preferably calculate the cyclic control signals based on an adaptive control method when the frequencies of the cyclic pulsating signals are higher than the predetermined frequency.

When the frequencies of the cyclic pulsating signals are a predetermined frequency or less, employing a map control, which uses a data map for controlling the electromagnetic actuator, can make the response of the present active vibration insulator favorable. Note that map controls are inferior to adaptive controls in view of the adaptability. However, since there are few signals relating to other than engines when engine revolutions are low, it is possible to adequately inhibit the vibrations resulting from engines from transmitting. On the contrary, enhancing the response can securely suppress the vibrations resulting from engines. On the other hand, when the frequencies of the cyclic pulsating signals are higher than the predetermined frequency, employing an adaptive control method can adaptively inhibit the vibrations, which are affected by various driving conditions, from transmitting.

EXAMPLES

Hereinafter, the present active vibration insulator will be described in detail while naming specific examples.

(1) Overall Arrangement of Active Vibration Insulator 1

An overall arrangement of an active vibration insulator 1 according to an example of the present invention will be described with reference to FIG. 1. FIG. 1 is a block diagram for illustrating the overall arrangement of the active vibration insulator 1. The active vibration insulator 1 is an apparatus for actively inhibiting vibrations, which an engine E/G installed to a vehicle generates, from transmitting to parts of the vehicle. As shown in the drawing, the active vibration insulator 1 comprises a frequency calculator 11, a mode switcher 12, a driving-condition-signals output device 13, a map controller 14, an adaptive controller 15, a driver 16, a vibrator 17, and an acceleration sensor 18.

(1-1) Frequency Calculator 11

The frequency calculator 11 receives cyclic pulsating signals from a rotary detector (not shown) for detecting the revolutions of the engine E/G. Then, the frequency calculator 11 calculates the frequencies f of the cyclic pulsating signals based on the input cyclic pulsating signals.

(1-2) Mode Switcher 12

The mode switcher 12 receives the frequencies f of the cyclic pulsating signals which the frequency calculator 11 calculates. Then, the mode switcher 12 judges switching from a map control mode to an adaptive control mode, or vice versa, based on the input frequencies f of the cyclic pulsating signals. The mode switcher 12 selects one or the other of map control mode and adaptive control mode. Note that the mode switching process, map control mode and adaptive control mode will be described in detail later.

(1-3) Driving-condition-signals Output Device 13

The driving-condition-signals output device 13 is used during the map control mode. The driving-condition-signals output device 13 outputs vehicle-driving conditions, such as shift positions of a transmission (e.g., forward "D," neutral "N," and reverse "R") and turned-on or off air-conditioner switch, to the map controller 14.

(1-4) Map Controller 14 (i.e., Control-signals Outputting Means)

The map controller 14 operates when the mode switcher 12 switches the adaptive control mode to the map control mode. That is, when the adaptive control mode is switched to the map control mode, the map controller 14 receives the frequencies f of the cyclic pulsating signals, which the frequency calculator 11 calculates, and the driving-condition signals, which the driving-condition-signals output device 13 outputs. Then, the map controller 14 calculates cyclic control signals based on the input frequencies f of the cyclic pulsating signals and the input driving-condition signals as well as a map data stored in a later-described map data storage. Note that the map controller 14 will be described in detail later.

(1-5) Adaptive Controller 15 (i.e., Control-signals Outputting Means)

On the other hand, the adaptive controller 15 operates when the mode switcher 12 switches the map control mode to the adaptive control mode. That is, when the map control mode is switched to the adaptive control mode, the adaptive controller 15 receives the frequencies f of the cyclic pulsating signals, which the frequency calculator 11 calculates, and acceleration signals, which the later-described acceleration sensor 18 detects. Then, the adaptive controller 15 calculates cyclic control signals by means of an adaptive control method, based on the input frequencies f of the cyclic pulsating signals and the input acceleration signals. Note that the adaptive controller 15 will be described in detail later.

(1-6) Driver 16 (i.e., Driving Means)

The driver 16 actuates the later-described vibrator 17 based on the cyclic signals which the map controller 14 or the adaptive controller 15 outputs. The driver 16 receives information on the control mode which the mode switcher 12 selects. That is, when the mode switcher 12 switches the adaptive control mode to the map control mode, the driver 16 actuates the vibrator 17 based on the cyclic control signals which the map controller 14 outputs. On the other hand, when the mode switcher 12 switches the map control mode to the adaptive control mode, the driver 16 actuates the vibrator 17 based on the cyclic control signals which the adaptive controller 15 outputs. Note that the driver 16 will be described in detail later.

(1-7) Vibrator 17 (i.e., Electromagnetic Actuator)

The vibrator 17 is a solenoid which is installed to an engine mount (not shown). The solenoid, the accelerator 17, generates vibrating forces when electricity is supplied to its coil. That is, controlling the electric-current supply to the coil of the solenoid, the vibrator 17, can vary the vibrating forces. Moreover, when the vibrations of the engine E/G and the vibrations generated by the vibrator 17 cancel with each other, the vibrations of the engine E/G are not transmitted to the vehicle's side. Note that the vibrator 17 will be described in detail later.

(1-8) Acceleration Sensor 18

The acceleration sensor 18 is installed to a fixing part, one of the parts of the engine mount, at which the engine mount is fixed to an engine frame. That is, the acceleration sensor 18 detects vibrations at the fixing part, one of the parts of the engine mount. Specifically, the acceleration sensor 18 detects vibrations which are produced by synthesizing the vibrations of the engine E/G transmitted by way of a transfer system C and the vibrations generated by the vibrator 17. The synthesized vibrations are turned into so-called error signals. Moreover, the acceleration sensor 18 outputs the error signals to the adaptive controller 15.

(2) Detailed Arrangement of Engine Mount Equipped with Vibrator and Comprising Vibrator 17 and Acceleration Sensor 18

Figure 2:
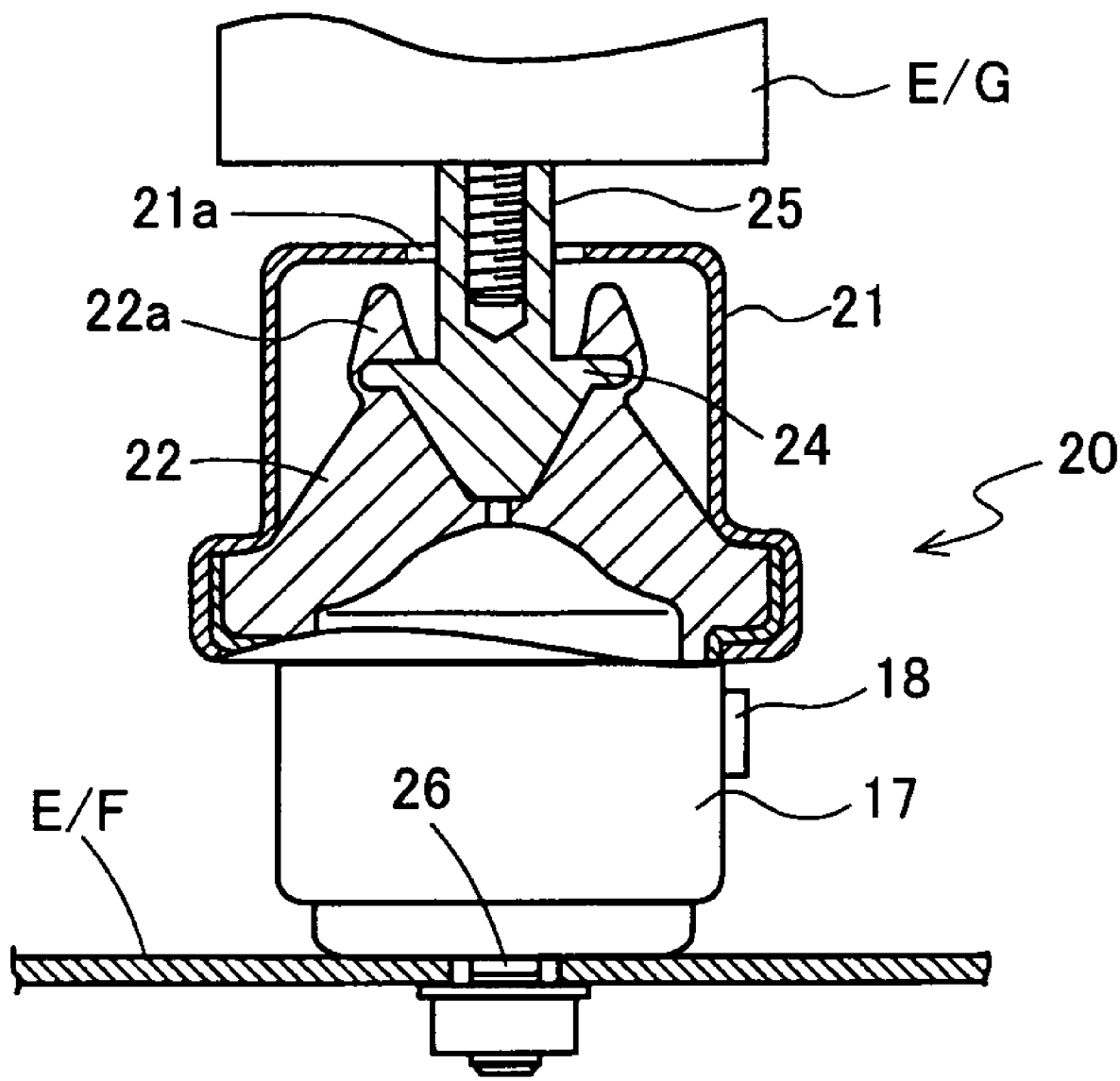
FIG. 2 illustrates a partially cross-sectional view of an engine mount 20 equipped with a vibrator.

Subsequently, a detailed arrangement of an engine mount equipped with a vibrator and comprising the vibrator 17 and acceleration sensor 18 will be hereinafter described with reference to FIG. 2. FIG. 2 illustrates a partial cross-sectional view of an engine mount 20 equipped with a vibrator. As shown in the drawing, the engine mount 20 equipped with a vibrator comprises a cylinder-shaped case 21, an insulation rubber 22, a fixture fitting 24, the vibrator 17, and the acceleration sensor 18. The insulation rubber 22 is disposed in the case 21. Moreover, the insulation rubber 22 is fixed to the inner wall of the cover 21 on one of the opposite sides, which is disposed on the vibrator 17's side. In addition, the insulation rubber 22 is provided with a stopper 22a which is disposed to face one of the opposite ends of the case 21 so as to accommodate an opposite-end installation member of the fixture fitting 24 therein. That is, the insulation rubber 22 is installed to the fixture fitting 24 on the other one of the opposite sides, which is disposed oppositely with respect to the vibrator 17.

The fixture fitting 24 comprises the installation member, and a fixture shaft 25. The fixture shaft 25 is disposed on the opposite side of the insulation rubber 22 with respect to the installation member, and is directed oppositely with respect to the installation member. Moreover, the fixture fitting 24 protrudes out through a through hole 21a, which is formed on one of the opposite sides of the case 21, on the leading-end side of the fixture shaft 25. In addition, the fixture shaft 25 is fixed to the engine E/G.

The vibrator 17 comprises a coil (not shown), and a core (not shown). The coil is wound in the peripheral direction of the vibrator 17. The core is held in the coil, and is disposed about the axial center of the coil. Moreover, the core is reciprocated by making the electric-current supply to the coil variable. The reciprocating core generates the vibrating forces. In addition, the other one of the opposite sides of the case 21 is provided with a fixture shaft 26. The fixture shaft 26 is installed to an engine frame E/F.

The acceleration sensor 18 is fixed to an outer periphery of the case 21. That is, the acceleration sensor 18 meters the vibrations of the case 21 of the engine mount 20 equipped with a vibrator.

(3) Processing Operations of Mode Switcher 12

Figure 3:
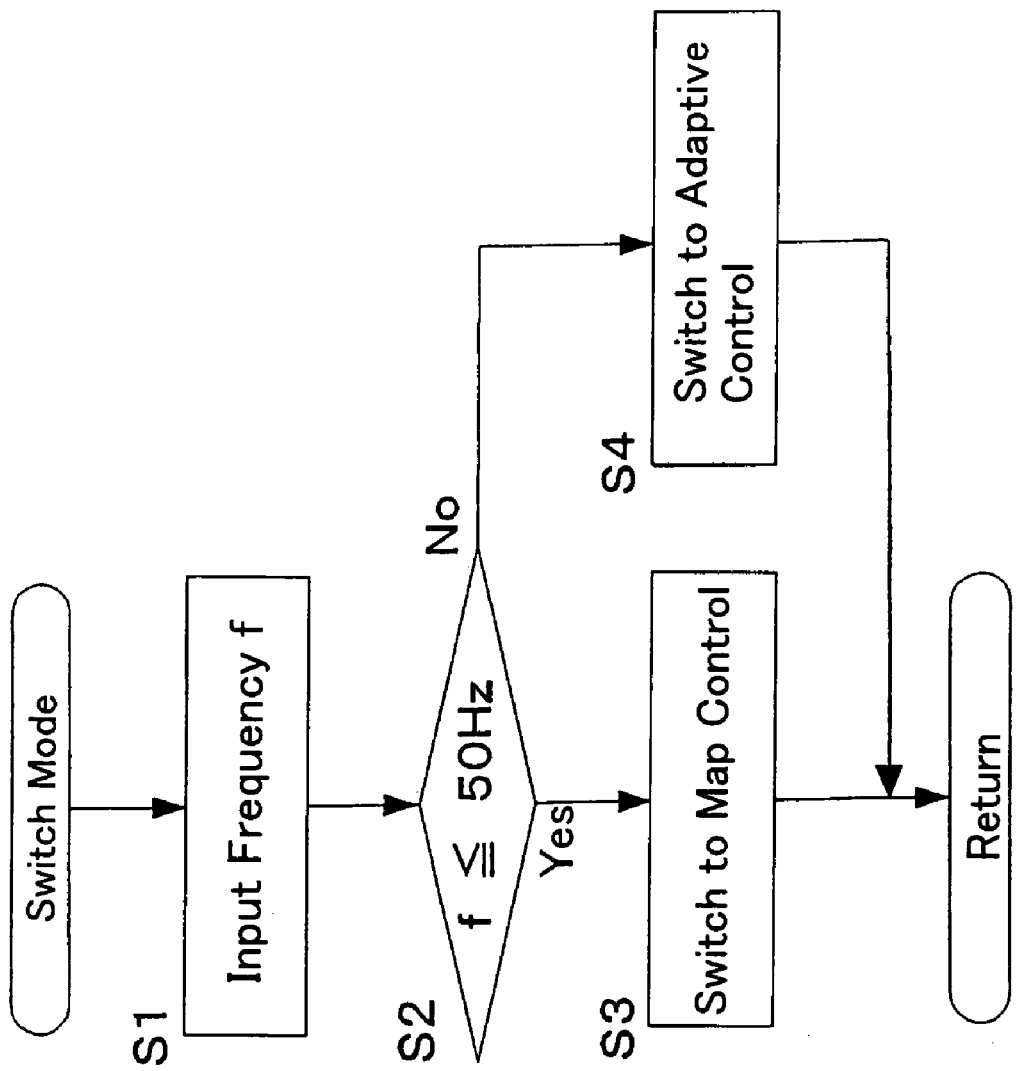
FIG. 3 is a flowchart for illustrating processing operations of a mode switcher 12.

Firstly, the processing operations of the above-described mode switcher 12 will be hereinafter described with reference to FIG. 3. FIG. 3 is a flowchart for illustrating the processing operations of the mode switcher 12. As shown in the drawing, the frequencies f of the cyclic pulsating signals, which the frequency calculator 11 calculates, are input into the mode switcher 12 at step S1. Next, the mode switcher 12 judges whether the input frequencies f of the cyclic pulsating signals are 50 Hz or less at step S2. When the frequencies f of the cyclic pulsating signals are 50 Hz or less, the mode switcher 12 switches the adaptive control mode to the map control mode at step S3. On the other hand, when the frequencies f of the cyclic pulsating signals are higher than 50 Hz, the mode switcher 12 switches the map control mode to the adaptive control mode at step S4. That is, when the frequencies f of the cyclic pulsating signals are low frequencies, the adaptive control mode is switched to the map control mode; and, when the frequencies f of the cyclic pulsating signals are high frequencies, the map control mode is switched to the adaptive control mode.

The reasons for setting up the frequency, at which the control modes are switched, to 50 Hz will be hereinafter described briefly. As described above, the mode switcher 12 switches the adaptive control mode to the map control mode when the frequencies f are 50 Hz or less; and switches the map control mode to the adaptive control mode when the frequencies f are higher than 50 Hz. Note that the map control mode, carried out when the frequencies f are low, actively inhibits the vibrations from transmitting while taking the primary frequency component and higher-order frequency components of the vibrations resulting from the engine E/G into consideration, as described later. On the other hand, the adaptive control mode, carried out when the frequencies f are high, actively inhibits the vibrations from transmitting while taking only the primary frequency component of the vibrations resulting from the engine E/G into consideration.

However, the natural frequency of the engine frame E/F, to which the engine E/G is installed, falls in a range of from 80 to 100 Hz approximately. That is, when the frequencies f are 50 Hz or less, the higher-order-frequency components of the vibrations resulting from the engine E/G might coincide with the natural frequency of the engine frame E/F. If they coincide, the resonant action might vibrate the engine frame E/F considerably. On the other hand, when the frequencies f are higher than 50 Hz, the higher-order-frequency components of the vibrations resulting from the engine E/G do not coincide with the natural frequency of the engine frame E/F at all.

That is, unless the engine frame E/F resonates to the higher-order-frequency components of the vibrations resulting from the engine E/G, the active vibration insulator 1 carries out the map control, in which only the higher-order-frequency components are taken into consideration, when the frequencies f are 50 Hz or less.

(4) Detailed Arrangement of Map Controller 14 and Low-frequency Control Signal C1

(4-1) Detailed Arrangement of Map Controller 14

Secondly, the detailed arrangement of the map controller 14 will be hereinafter described with reference to FIG. 4.

Figure 4:
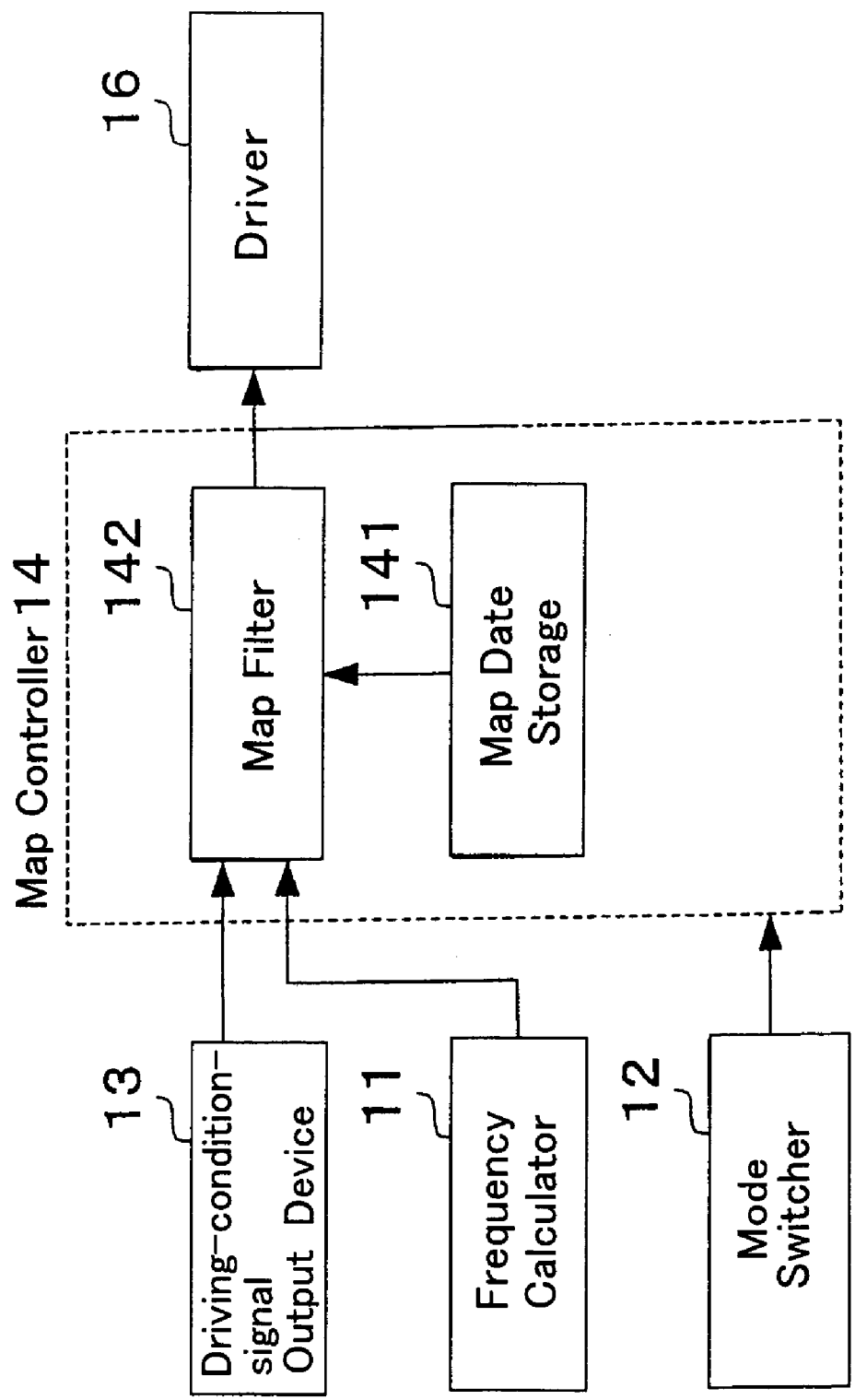
FIG. 4 is a block diagram for illustrating an arrangement of a map controller 14.

FIG. 4 is a block diagram for illustrating the arrangement of the map controller 14. As illustrated in the drawing, the map controller 14 comprises a map data storage 141, and a map filter 142. As described above, the map controller 14 operates when the mode switcher 12 switches the adaptive control mode to the map control mode.

The map data storage 141 stores filter coefficients, which depend on the frequencies f of the cyclic pulsating signals and driving conditions, in advance. Here, the filter coefficients comprise amplitude vales a, which are equivalent to filter coefficient gains, and phase values φ, which are equivalent to filter coefficient phases. The frequencies f of the cyclic pulsating signals, which the frequency calculator 11 calculates, and the driving-condition signals, which the driving-condition-signals output device 13 outputs, are input into the map filter 142. Moreover, the map data storage 141 inputs the filter coefficients, which correspond to the input frequencies f of the cyclic pulsating signals and the input driving-condition signals, into the map filter 142. The map filter 142 carries out amplitude and phase compensations based on these pieces of input information to generate a cyclic control signal (i.e., a low-frequency control signal) C1. In addition, the map filter 142 outputs the generated low-frequency control signal C1 to the driver 16.

(4-2) Low-frequency Control Signal C1

Figure 5:
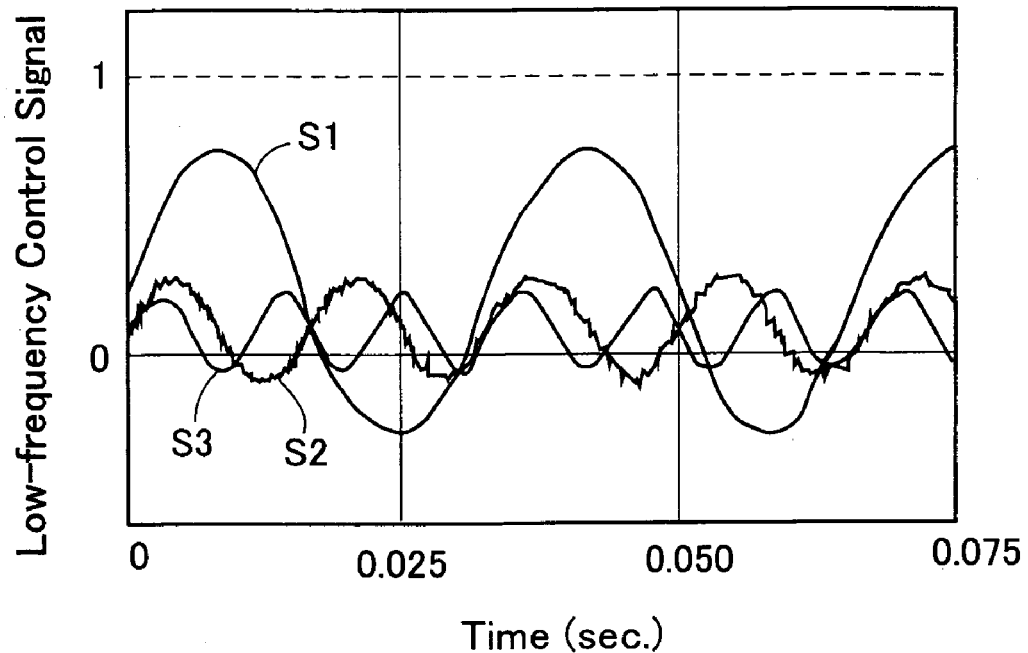
FIG. 5 is a diagram for illustrating a primary frequency component S1, a secondary frequency component S2 and a tertiary component S3 in relation to a low-frequency control signal C1, which a map filter 142 outputs, respectively.
Figure 6:
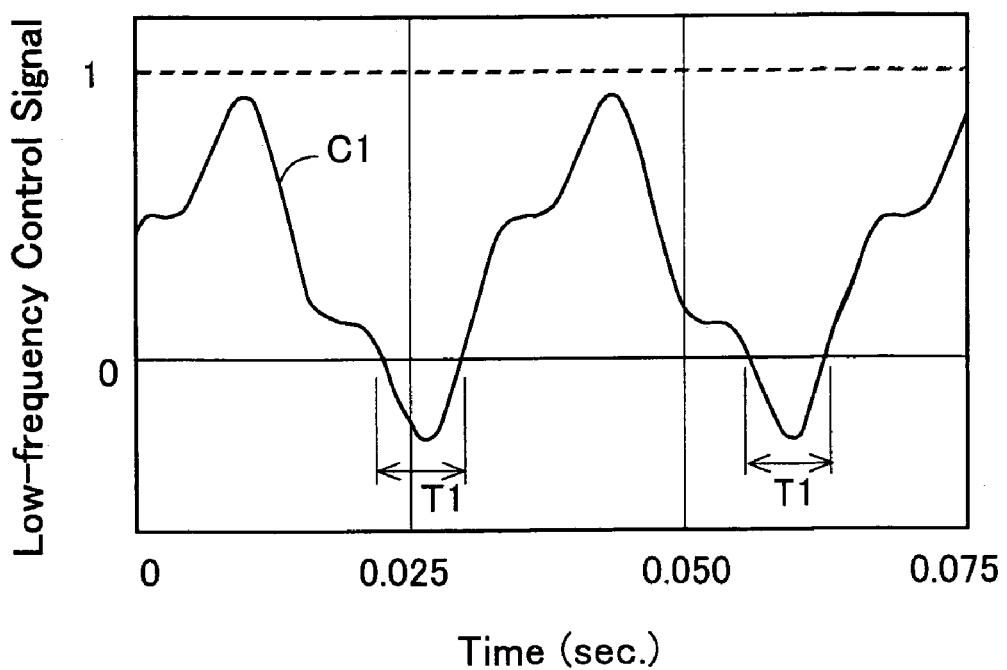
FIG. 6 is a diagram for illustrating the low-frequency control signal C1, in which the frequency components of the respective orders shown in FIG. 5 are synthesized.

The low-frequency control signal C1, which the map filter 142 generates, will be hereinafter described with reference to FIGS. 5 and 6. FIG. 5 is a diagram for illustrating a primary frequency component, a secondary frequency component and a tertiary frequency component of the low-frequency control signal C1, which the map filter 142 outputs, respectively. FIG. 6 is a diagram for illustrating the low-frequency control signal C1 which is produced by synthesizing the frequency components of the respective orders shown in FIG. 5. Note that FIGS. 5 and 6 show the low-frequency control signal C1 for a cyclic pulsating signal whose frequency f is 30 Hz, and represent the maximum value so as to be equal to 1.

The low-frequency control signal C1, which the map filter 142 generates, is calculated based on following equation (1). Since the order k is herein limited up to tertiary, K=3 in equation (1). Moreover, as expressed in equation (1), the low-frequency control signal C1 is a signal which is produced by synthesizing a primary frequency component S1, a secondary frequency component S2 and a tertiary component S3 of a cyclic pulsating signal with a frequency f. In addition, the primary frequency component S1, secondary frequency component S2 and tertiary component S3 are herein sine-wave signals, respectively. Note that the "offset" is a value which is set up in advance depending on a vehicle.

Equation (1):

$$y_{(n)} = \sum_{k=1}^{K} (a_{k(n)}/2) \cdot \sin(k\omega \cdot \Delta T \cdot n + \phi_{k(n)}) + a_{k(n)}/\text{offset}$$

$a_{(n)}$: Amplitude Value (or Filter Coefficient Gain)
$\phi_{(n)}$: Phase Value (or Filter Coefficient Phase)
$\omega$: Metered Angular Frequency
$\Delta T$: Sampling Cycle
N: Sampling Number (time)
k: Frequency Order (k=1, 2, 3)
offset: Offset for Output Calculated Value Thus, the signal waveforms of the primary, secondary and tertiary frequency components S1, S2 and S3 of the low-frequency control signal C1, which is produced based on equation (1), appear as shown in FIG. 5. Moreover, the signal waveform of the low-frequency control signal C1, which is produced by synthesizing the primary, secondary and tertiary frequency components S1, S2 and S3, appears as shown in FIG. 6.

(5) Detailed Arrangement of Adaptive Controller 15 and High-frequency Control Signal C2

(5-1) Detailed Arrangement of Adaptive Controller 15

Figure 7:
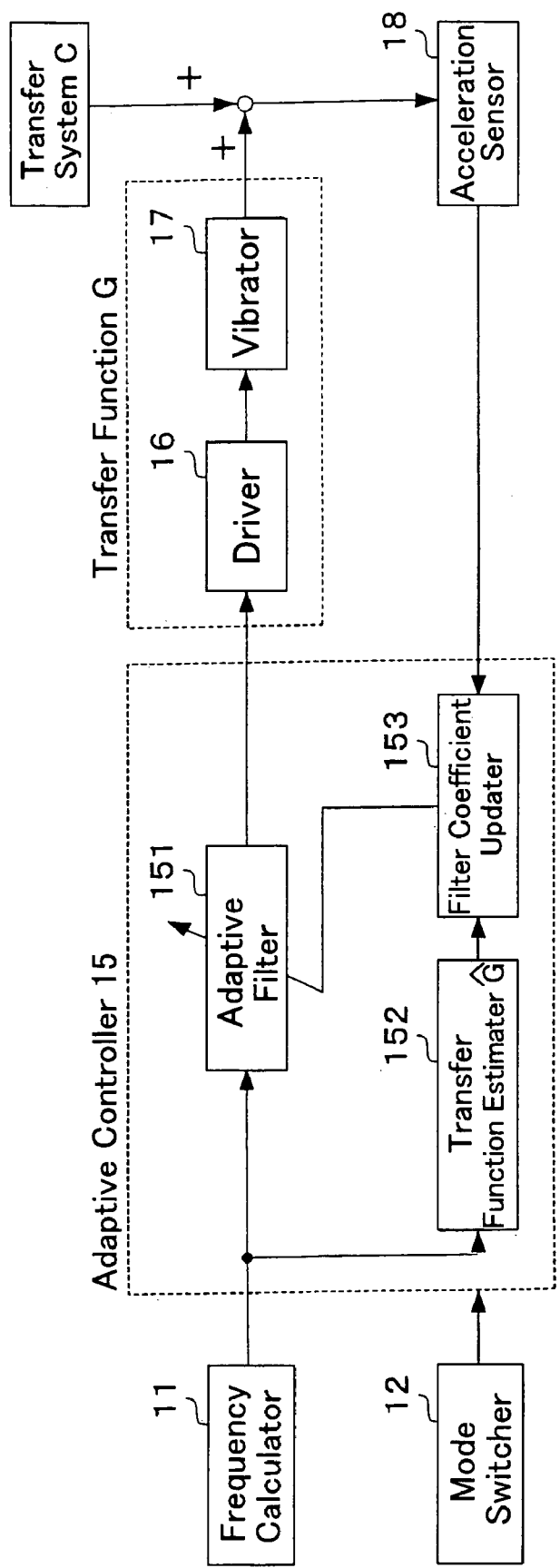
FIG. 7 is a block diagram for illustrating an arrangement of an adaptive controller 15.

Thirdly, the detailed arrangement of the adaptive controller 15 will be hereinafter described with reference to FIG. 7. FIG. 7 is a block diagram for illustrating the arrangement of the adaptive controller 15. The adaptive controller 15 herein employs an adaptive control method, which is carried out with a retarded harmonic synthesizer minimum mean squared filter (hereinafter referred to as "DXHS-LMS" filter). Note that the adaptive controller 15 operates when the mode switcher 12 switches the map control mode to the adaptive control mode, as described above.

As illustrated in FIG. 7, the adaptive controller 15 comprises an adaptive filter 151, a transfer function estimater 152, and a filter coefficient updater 153. The frequencies f of the cyclic pulsating signals, which the frequency calculator 11 calculates, and filter coefficients, which the filter coefficient updater 153 updates, are input into the adaptive filter 151. Moreover, the adaptive filter 151 carries out amplitude and phase compensations based on these pieces of input information to generate a cyclic control signal (i.e., a high-frequency control signal) C2. In addition, the adaptive filter 151 outputs the generated high-frequency control signal C2 to the driver 16.

The transfer function estimater 152 calculates an estimated value Ĝ (hereinafter referred to as an "estimated transfer function Ĝ") for an output-controlled system transfer function G of the adaptive filter 151. The output-controlled system herein comprises the driver 16, and vibrator 17. The filter coefficient adapter 153 updates the filter coefficients with the DXHS-LMS filter based on the output signals of the acceleration sensor 18 and the estimated transfer function Ĝ. Here, the filter coefficients comprise amplitude vales a, which are equivalent to filter coefficient gains, and phase values φ, which are equivalent to filter coefficient phases.

That is, the adaptive controller 15 updates the filter coefficients so as to make the output signals of the acceleration sensor 18, the errors at an observation point, equal to zero. Moreover, the adaptive controller 15 outputs a high-frequency control signal C2, which is subjected to amplitude and phase compensations, based on the updated filter coefficients.

(5-2) High-frequency Control Signal C2

Figure 8:
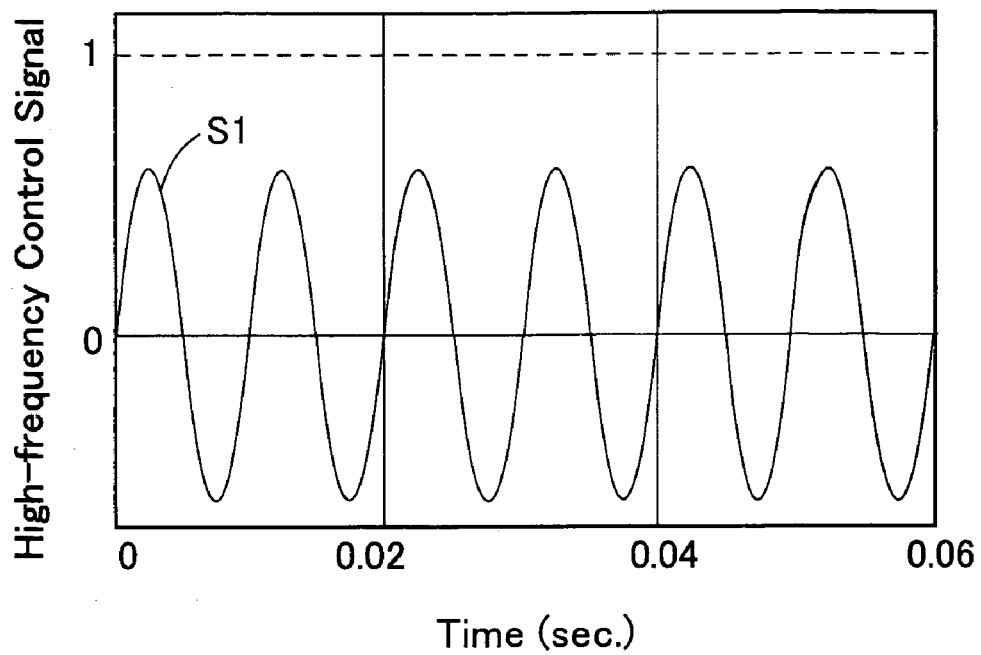
FIG. 8 is a diagram for illustrating a high-frequency control signal, which an adaptive filter 151 generates, and which is put in a state of sine wave before correction.
Figure 9:
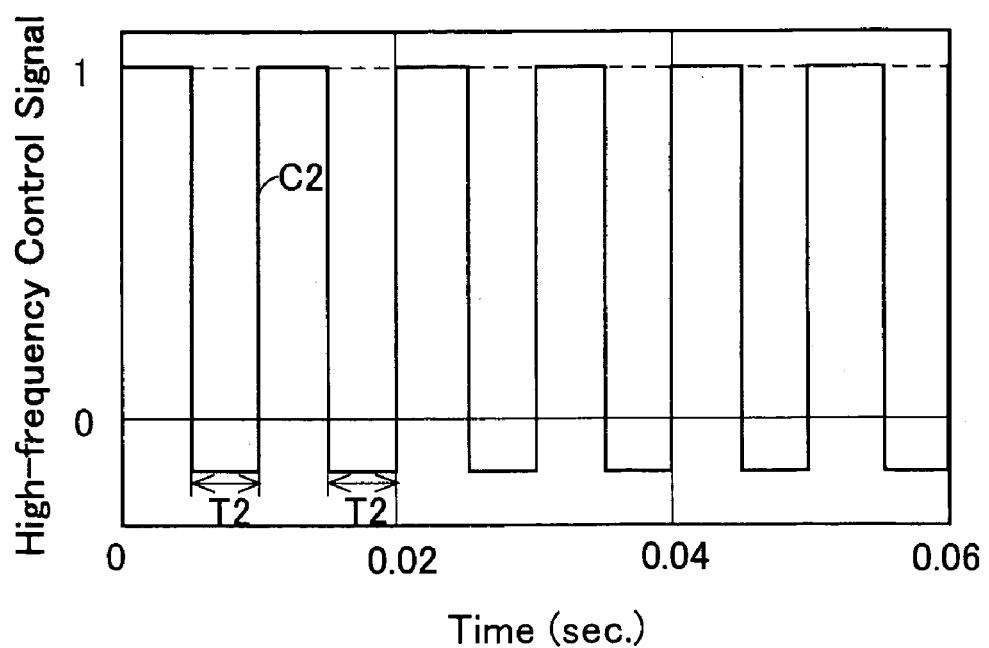
FIG. 9 is a diagram for illustrating a high-frequency control signal C2, which the adaptive filter 151 outputs.

The high-frequency control signal C2, which the adaptive filter 151 generates, will be hereinafter described with reference to FIGS. 8 and 9. FIG. 8 is a diagram for illustrating a high-frequency control signal S1, which the adaptive filter 151 generates, in a form of a sine-wave signal before correction. FIG. 9 is a diagram for illustrating the high-frequency control signal C2 which the adaptive filter 151 outputs. Note that FIGS. 8 and 9 show the high-frequency control signal C2 for a cyclic pulsating signal whose frequency f is 100 Hz, and represent the maximum value so as to be equal to 1.

The before-correction high-frequency control signal S1, which the adaptive filter 151 generates, is first calculated based on following equation (2). Since the order k is herein limited to primary alone, K=1 in equation (2). That is, the before-correction high-frequency control signal S1 is a sine-wave signal comprising a primary frequency component S1 of a cyclic pulsating signal with a frequency f alone. The waveform of the before-correction high-frequency control signal S1 is a sine wave which appears as shown in FIG. 8.

Equation (2):

$$y_{(n)} = \sum_{k=1}^{K} (a_{k(n)}/2) \cdot \sin(k\omega \cdot \Delta T \cdot n + \phi_{k(n)}) + a_{k(n)}/\text{offset}$$

Subsequently, the thus calculated before-correction high-frequency control signal S1 is subjected to correction in accordance with equation (3). The high-frequency control signal C2, which has undergone the correction, is a signal to be output to the driver 16. That is, Equation (3) converts before-correction sine-wave signals into rectangle-shaped wave signals. The after-correction high-frequency control signal C2 appears as a rectangle-shaped wave, as shown in FIG. 9.

when $y_{(n)} \geq 0$, $y_{(n)} = a_{k(n)}$; and when $y_{(n)} < 0$, $y_{(n)} = -0.15$ \hfill Equation (3):

(6) Detailed Arrangement of Driver 16

Figure 10:
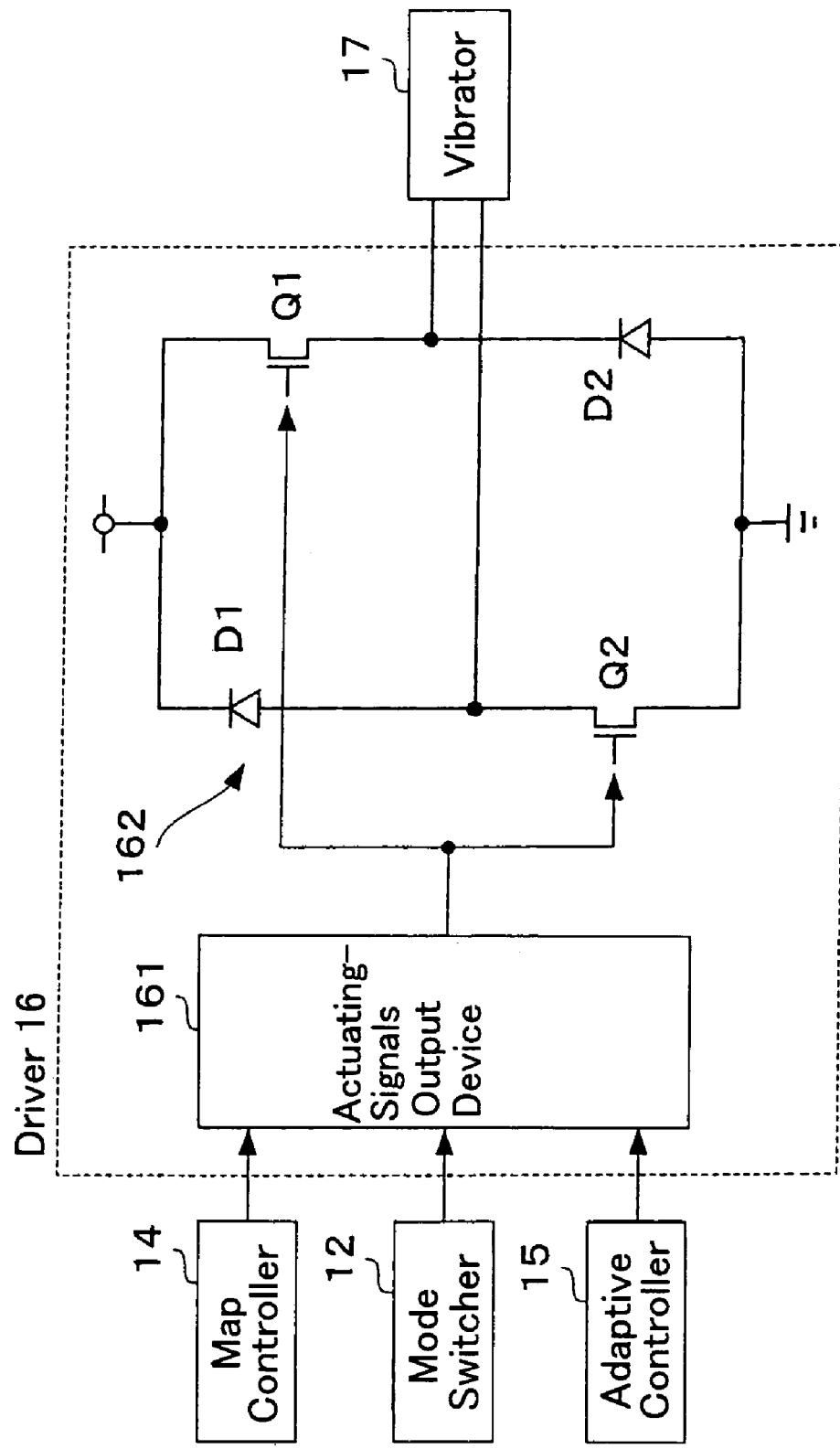
FIG. 10 is a block diagram for illustrating an arrangement of a driver 16.

Fourthly, the detailed arrangement of the driver 16 will be hereinafter described with reference to FIG. 10. FIG. 10 is a block diagram for illustrating the arrangement of the driver 16. As shown in the drawing, the driver 16 comprises an actuating-signals output device 161, and an asymmetric half-bridge circuit 162.

(6-1) Arrangement of Actuating-signals Output Device 161

The actuating-signals output device 161 outputs actuating signals for actuating later-described high-side switch Q1 and low-side switch Q2 based the control mode, which the mode switcher 12 outputs, and the cyclic control signal C1 or C2, which the map controller 14 or adaptive controller 15 outputs. Specifically, the actuating-signals output device 161 outputs gate voltages for actuating the high-side switch Q1 and low-side switch Q2.

(6-2) Arrangement of Half-bridge Circuit 162

The asymmetric half-bridge circuit 162 makes a so-called H-bridge circuit. A first diode D1 is disposed on a first upper arm, and the low-side switch Q2 is disposed on a first lower arm. The high-side switch Q1 is disposed on a second upper arm, and a second diode D2 is disposed on a second lower arm. Here, both high-side switch Q1 and low-side switch Q2 employ FETs (i.e., field-effect transistors).

Specifically, a cathode side of the first diode D1 is connected with a positive-terminal side, an anode side of the first diode D1 is connected with a drain side of the low-side switch Q2, and a source side of the low-side switch Q2 is connected with a negative-terminal side. Moreover, a drain side of the high-side switch Q1 is connected with the positive-terminal side, a source side of the high-side switch Q1 is connected with a cathode side of the second diode D2, and an anode side of the second diode D2 is connected with the negative-terminal side. Note that gate sides of the high-side switch Q1 and low-side switch Q2 are connected with the actuating-signals output device 161. That is, the high-side switch Q1 and low-side switch Q2 are turned on and off depending on the gate voltages which the actuating-signals output device 161 outputs.

In addition, output sides of the asymmetric half-bridge circuit 162 are connected with the vibrator 17. Specifically, an intermediate part between the first diode D1 and the low-side switch Q2, and an intermediate part between the high-side switch Q1 and the second diode D2 are connected with the opposite-end sides of the coil of the solenoid, the vibrator 17, respectively.

(6-3) Processing Operations of Driver 16

The processing operations of the driver 16 arranged as described above will be hereinafter described with reference to FIGS. 11 through 14.

(6-3-1) Processing Operations of Actuating-signals Output Device 161

Figure 11:
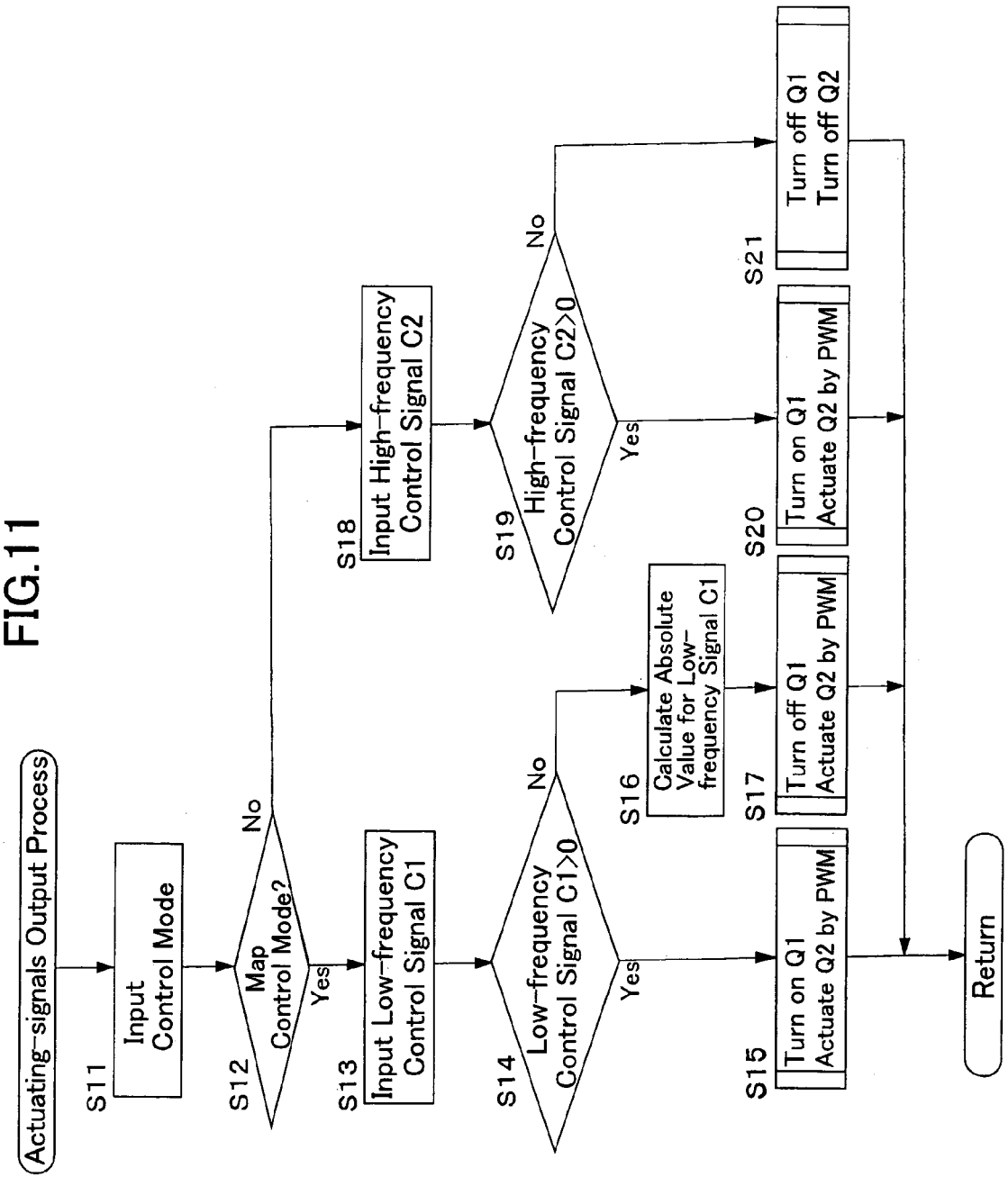
FIG. 11 is a flowchart for illustrating processing operations of an actuating-signals output device 161.

The processing operations of the actuating-signals output device 161 are first described with reference to FIG. 11. FIG. 11 is a flowchart for illustrating the processing operations of the actuating-signals output device 161.

As illustrated in FIG. 11, the mode switcher 12 first inputs a control mode into the actuating-signals output device 161 at step S11. Next, the actuating-signals output device 161 judges whether the input control mode is the map control mode or not at step S12. When the input control mode is the map control mode, that is, when the answer is "Yes" at step S12, the map controller 14 inputs the low-frequency control signal C1 into the actuating-signals output device 161 at step S13. The low-frequency control signal C1 comprises the signal shown in FIG. 6.

Subsequently, the actuating-signals output device 161 judges whether the low-frequency control signal C1, which the map controller 14 inputs into it, is positive or negative at step S14. When the low-frequency control signal C1 is positive, that is, when the answer is "Yes" at step S14, the actuating-signals output device 161 outputs actuating signals to the high-side switch Q1 and the low-side switch Q2, respectively, at step S15. One of the output actuating signals is for turning on the high-side switch Q1, and the other one of them is for actuating the low-side switch Q2 by means of pulse-width modulation with "DUTY," which is calculated based on the low-frequency control signal C1. Specifically, the actuating-signals output device 161 outputs the aforementioned actuating signals at intervals shown in FIG. 6 other than the intervals designated at "T1" of FIG. 6.

On the other hand, when the low-frequency control signal C1, which the map controller 14 inputs into the actuating-signals output device 161, is negative, that is, when the answer is "No" at step S14, the actuating-signals output device 161 calculates the absolute value of the low-frequency control signal C1 at step S16. Thereafter, the actuating-signals output device 161 outputs actuating signals to the high-side switch Q1 and the low-side switch Q2, respectively, at step S17. One of the output actuating signals is for turning off the high-side switch Q1, and the other one of them is for actuating the low-side switch Q2 by means of pulse-width modulation with "DUTY," which is calculated based on the absolute value of the low-frequency control signal C1. Specifically, the actuating-signals output device 161 outputs the aforementioned actuating signals at the intervals designated at "T1" of FIG. 6.

Moreover, when the input control mode is not the map control mode, that is, when the answer is "No" at step S12, the adaptive controller 15 inputs the high-frequency control signal C2 into the actuating-signals output device 161 at step S18. The high-frequency control signal C2 comprises the signal shown in FIG. 9, as described above. Then, the actuating-signals output device 161 judges whether the high-frequency control signal C2, which the adaptive controller 15 inputs into it, is positive or negative at step S19. When the high-frequency control signal C2 is positive, that is, when the answer is "Yes" at step S19, the actuating-signals output device 161 outputs actuating signals to the high-side switch Q1 and the low-side switch Q2, respectively, at step S20. One of the output actuating signals is for turning on the high-side switch Q1, and the other one of them is for actuating the low-side switch Q2 by means of pulse-width modulation with "DUTY," which is calculated based on the high-frequency control signal C2. Specifically, the actuating-signals output device 161 outputs the aforementioned actuating signals at intervals shown in FIG. 9 other than the intervals designated at "T2" of FIG. 9.

On the other hand, when the high-frequency control signal C2, which the adaptive controller 15 inputs into the actuating-signals output device 161, is negative, that is, when the answer is "No" at step S19, the actuating-signals output device 161 outputs actuating signals to the high-side switch Q1 and the low-side switch Q2, respectively, at step S21. One of the output actuating signals is for turning off the high-side switch Q1, and the other one of them is for turning off the low-side switch Q2. Specifically, the actuating-signals output device 161 outputs the aforementioned actuating signals at the intervals designated at "T2" of FIG. 9.

(6-3-2) Operations of Asymmetric Half-bridge Circuit 162

Figure 12:
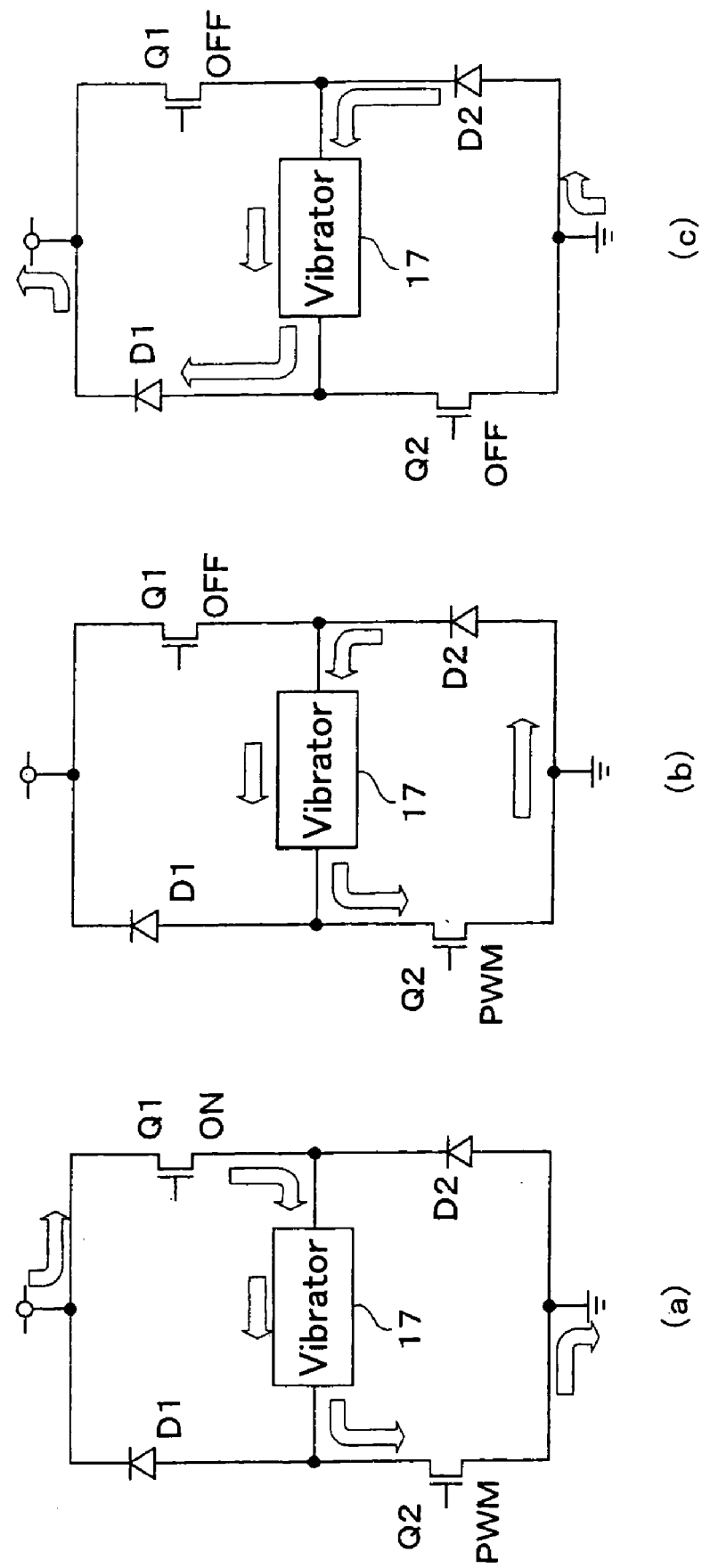
FIG. 12 is a diagram for illustrating electric currents, which flow in an asymmetric half-bridge circuit 162 depending on the operations of respective switches Q1, Q2.
Figure 13:
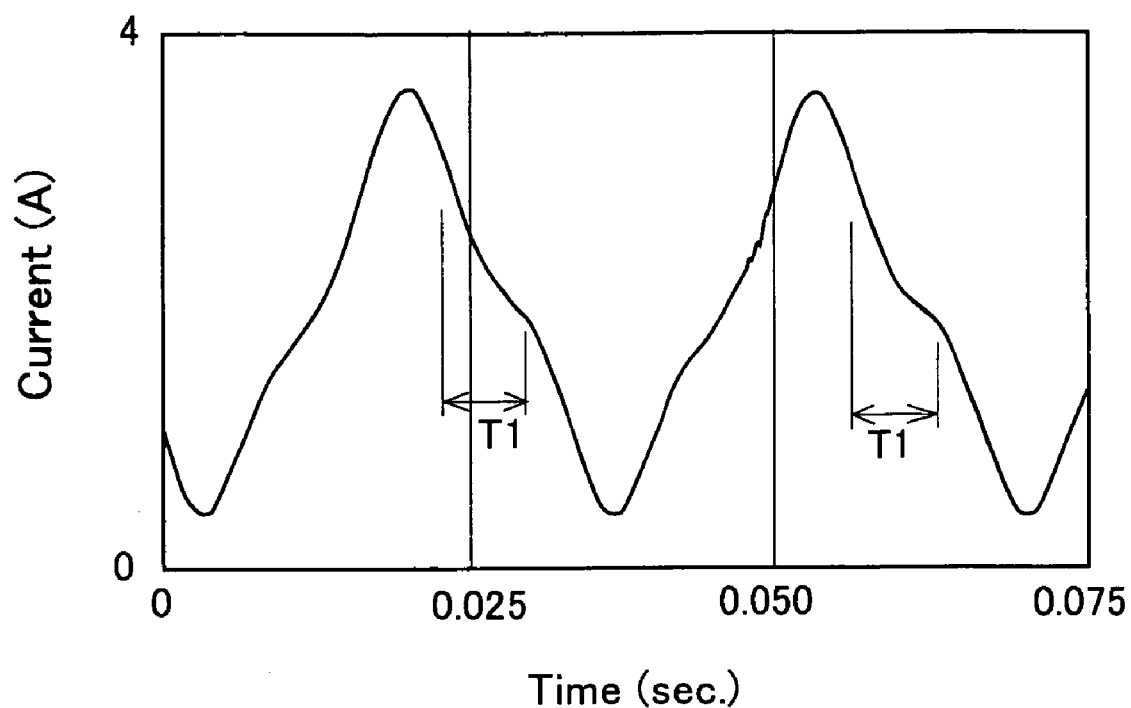
FIG. 13 is a diagram for illustrating the value of electric current, which flows in a coil of a vibrator 17 in a map control mode.
Figure 14:
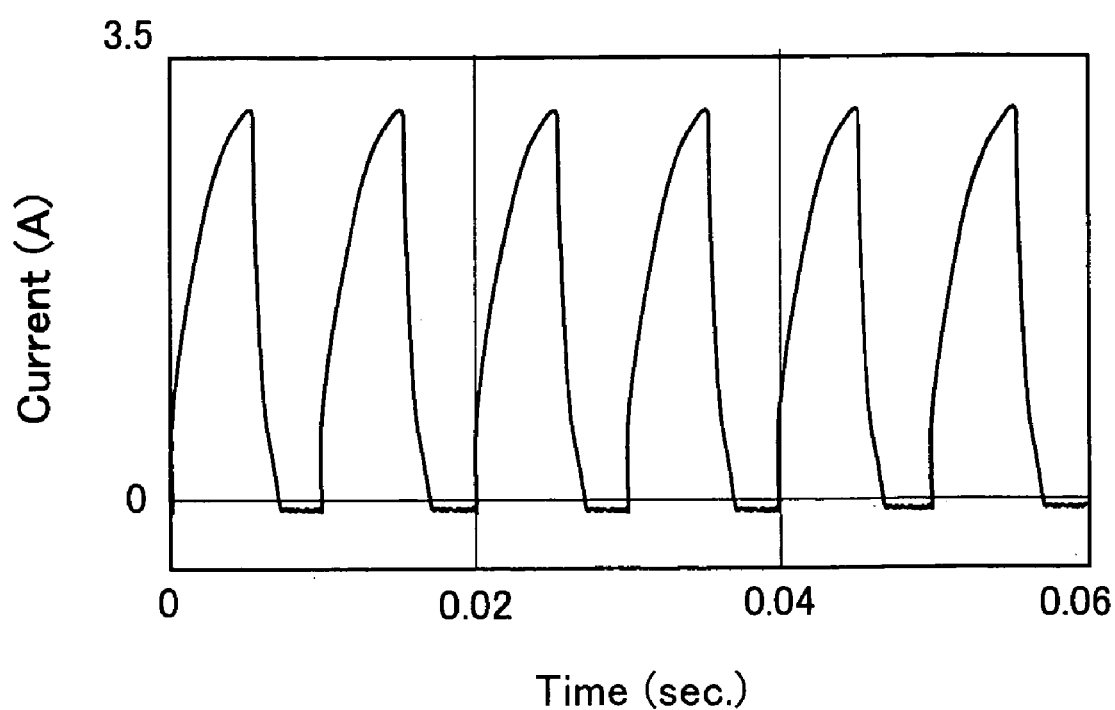
FIG. 14 is a diagram for illustrating the value of electric current, which flows in the vibrator 17 in an adaptive control mode.

Subsequently, the operations of the asymmetric half-bridge circuit 162 will be described with reference to FIGS. 12 through 14. FIGS. 12(a), (b) and (c) are diagrams for illustrating electric currents which flow in the asymmetric half-bridge circuit 162 depending on the operations of the high-side switch Q1 and low-side switch Q2. FIG. 13 is a diagram for illustrating the values of electric currents, which flow in the coil of the solenoid, the vibrator 17, in the map control mode. FIG. 14 is a diagram for illustrating the values of electric currents, which flow in the coil of the solenoid, the vibrator 17, in the adaptive control mode. Hereinafter, the operations of the asymmetric half-bridge circuit 162 are described for each of the control modes, and for each of the operations of the high-side switch Q1 and low-side switch Q2.

(6-3-2-1) When Being Positive Low-frequency Control Signal C1 in Map Control Mode Firstly, the operations of the asymmetric half-bridge circuit 162 when the low-frequency control signal C1 is positive are described with reference to FIG. 12(a) and FIG. 13. In this instance, the high-side switch Q1 is turned on, and the low-side switch Q2 is actuated by means of pulse-width modulation. In the asymmetric half-bridge circuit 162 under the circumstances, an electric current flows as indicated by the arrows of FIG. 12(a). Specifically, the electric current flows from the positive-terminal side in the directions toward the high-side switch Q1, the coil of the vibrator 17, the low-side switch Q2 and the negative-terminal side in this order. Note that, since the low-side switch Q2 is actuated by mans of pulse-width modulation, the flowing electric current is proportional to the "DUTY" of pulse-width modulation.

Specifically, as illustrated in FIG. 6 and FIG. 13, the value of the electric current flowing in the coil of the vibrator 17 enlarges when the value of the low-frequency control signal C1 is large; and the value of the electric current flowing in the coil of the vibrator 17 diminishes when the value of the low-frequency control signal C1 is small. Note that the vibrating forces generated by the vibrator 17 is proportional to the magnitude of the electric current flowing in the coil. Therefore, the vibrator 17 can generate a vibrating force, which is produced while taking the primary frequency component S1, secondary frequency component S2 and tertiary frequency component S3 of the cyclic pulsating signal with the frequency f, when the low-frequency control signal C1 is positive.

(6-3-2-2) When Being Negative Low-frequency Control Signal C1 in Map Control Mode Secondly, the operations of the asymmetric half-bridge circuit 162 when the low-frequency control signal C1 is negative are described with reference to FIG. 12(b) and FIG. 13. In this instance, the high-side switch Q1 is turned off, and the low-side switch Q2 is actuated by means of pulse-width modulation. In the asymmetric half-bridge circuit 162 under the circumstances, a circumfluent electric current flows as indicated by the arrows of FIG. 12(b). Specifically, the circumfluent electric current flows around from the second diode D2 in the directions toward the coil of the vibrator 17, the low-side switch Q2, the negative-terminal side and back to the second diode D2 in this order. The inductance action of the vibrator 17's coil causes the circumfluent electric current to flow. Therefore, the circumfluent electric current diminishes gradually as time elapses. More specifically, the electric current flowing in the coil of the vibrator 17 decreases, as shown in FIG. 13, at the intervals designated at "T1" of FIG. 13.

The reason for actuating the low-side switch Q2 by means of pulse-width modulation will be hereinafter described. Compared with the case where both high-side switch Q1 and low-side switch Q2 are turned off, a consequence can be produced that the value of the electric current flowing in the coil of the vibrator 17 is decreased at a lesser reduction rate when the high-side switch Q1 is turned off and the low-side switch Q2 is actuated by means of pulse-width modulation. As a result, actuating the low-side switch Q2 by means of pulse-width modulation can keep the value of the electric current flowing in the coil of the vibrator 17 from being zero. Thus, keeping the electric-current value from being zero can inhibit the turned-on electricity supply to the coil of the vibrator 17 from being turned off. That is, it is possible to suppress the generation of abnormal noises, which results from turning off the turned-on electricity supply to the coil of the vibrator 17.

(6-3-2-3) When Being Positive High-frequency Control Signal C2 in Adaptive Control Mode Thirdly, the operations of the asymmetric half-bridge circuit 162 when the high-frequency control signal C2 is positive are described with reference to FIG. 12(a) and FIG. 14. In this instance, the high-side switch Q1 is turned on, and the low-side switch Q2 is actuated by means of pulse-width modulation. In the asymmetric half-bridge circuit 162 under the circumstances, an electric current flows as indicated by the arrows of FIG. 12(a). Here, the high-frequency control signal C2 comprises a rectangle-shaped wave signal as shown in FIG. 9. Therefore, the low-side switch Q2 is actuated by means of pulse-width modulation depending on constant "DUTY." That is, when the high-frequency control signal C2 is positive, the electric-current value rises depending on a fixed time constant, as illustrated in FIG. 14. Moreover, converting the high-frequency control signal C2 into the rectangle-shaped wave signal can enlarge the rising rate of the value of the electric current flowing in the coil of the vibrator 17. As a result, the asymmetric half-bridge circuit 162 can cause the vibrator 17 to generate greater vibrating forces.

(6-3-2-4) When Being Negative High-frequency Control Signal C2 in Adaptive Control Mode Fourthly, the operations of the asymmetric half-bridge circuit 162 when the high-frequency control signal C2 is negative are described with reference to FIG. 12(c) and FIG. 14. In this instance, both high-side switch Q1 and low-side switch Q2 are turned off. In the asymmetric half-bridge circuit 162 under the circumstances, a regenerative electric current flows as indicated by the arrows of FIG. 12(c). Specifically, the regenerative electric current flows from the negative-terminal side in the directions toward the second diode D2, the coil of the vibrator 17, the first diode D1 and the positive-terminal side in this order. In this occasion, the electric-current value diminishes rapidly to zero depending on a fixed time constant, as illustrated in FIG. 14.

(7) Advantages (7-1) Advantages Produced by Map Control Mode

In the map control mode, the vibrator 17 generates vibrating forces based on the low-frequency control signal C1 in which the higher-order frequency components of the cyclic pulsating signal having the frequency f are taken into account. That is, the active vibration insulator 1 can appropriately inhibit the higher-order frequency components of the vibrations resulting from engines from transmitting. As a result, even when the higher-order frequency components of the vibration resulting from engines coincide with the natural frequencies of engine frames, the active vibration insulator 1 can appropriately inhibit the vibrations from transmitting without resonating the higher-order components to the natural frequencies.

Moreover, the active vibration insulator 1 controls the electric current flowing in the coil of the vibrator 17 so as not to become zero. That is, the active vibration insulator 1 can inhibit the turned-on electricity supply to the vibrator 17 from being turned off. Therefore, the active vibration insulator 1 can suppress the abnormal noises, which are generated when the turned-on electricity supply to the vibrator 17 is turned off.

(7-2) Advantages Produced by Adaptive Control Mode

In the adaptive control mode, the active vibration insulator 1 actuates the vibrator 17 based on the high-frequency control signal C2 which is corrected to the rectangle-shaped wave signal. Accordingly, the active vibration insulator 1 can exhibit upgraded response, and can cause the vibrator 17 to generate large vibrating forces. Consequently, even when engines operate at high revolutions, the active vibration insulator 1 can appropriately inhibit the vibrations resulting from the engines from transmitting.

(8) Modified Versions

(8-1) Another Low-frequency Control Signal C3 and Value of Electric Current Resulting therefrom to Flow in Vibrator 17

(8-1-1) Outlined Low-frequency Control Signal C3

In the above-described example, the low-frequency control signal C1 is a signal which comprises sine waves, the primary frequency component S1, secondary frequency component S2 and tertiary frequency component S3 of the cyclic pulsating signal having the frequency f. However, the active vibration insulator 1 can employ another low-frequency control signal C3 as hereinafter described. Note that the active vibration insulator 1 according to the example can produce remarkably high silence because the low-frequency control signal C1 used in the example can cause the vibrator 17 to generate small vibrating forces but can let the vibrator 17 generate vibrating forces which are adapted appropriately to the vibrations generated by engines. On the other hand, the following low-frequency control signal C3 can cause the vibrator 17 to produce larger vibrating forces.

(8-1-2) Detailed Low-frequency Control Signal C3

Figure 15:
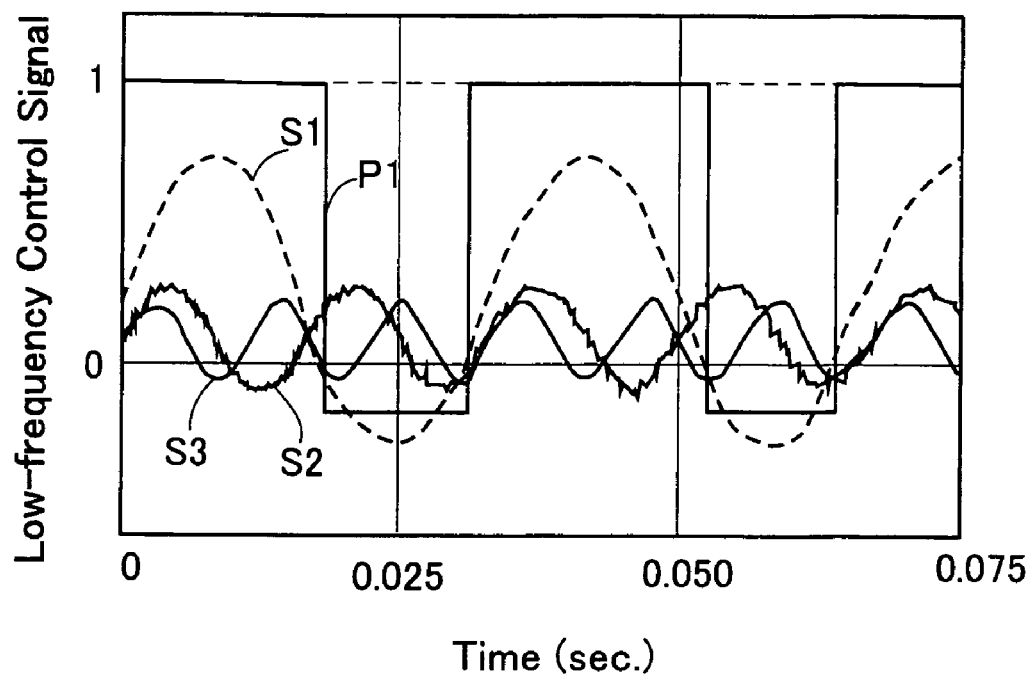
FIG. 15 is a diagram for illustrating a primary frequency component P1, a secondary frequency component S2 and a tertiary component S3 in relation to a low-frequency control signal C3, which the map filter 142 outputs, respectively.
Figure 16:
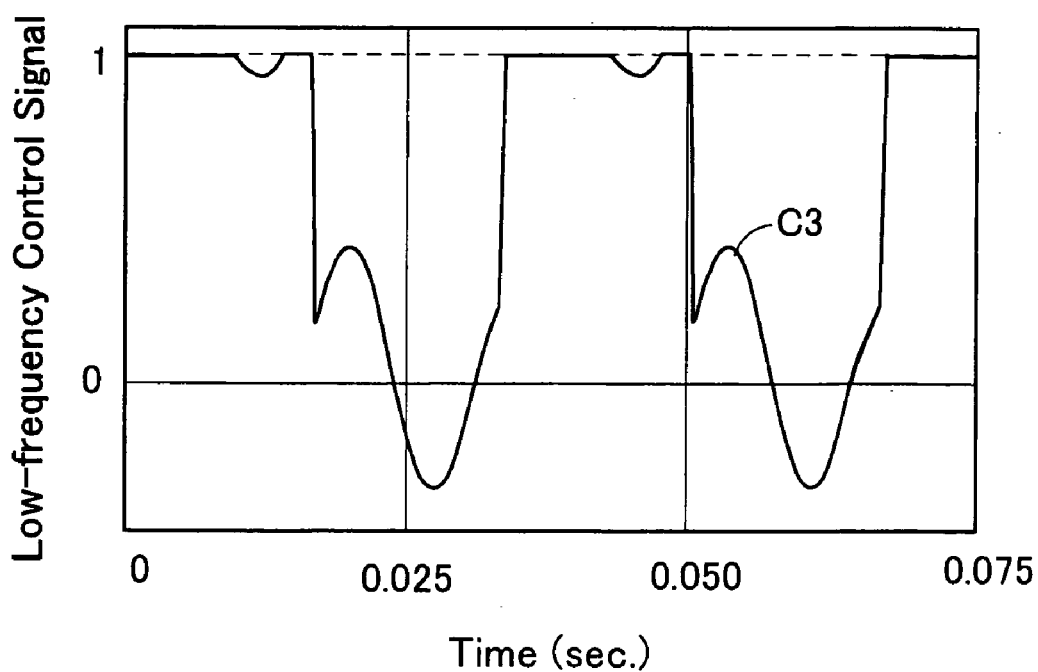
FIG. 16 is a diagram for illustrating the low-frequency control signal C3, in which the frequency components of the respective orders shown in FIG. 15 are synthesized.

The low-frequency control signal C3 will be hereinafter described with reference to FIGS. 15 and 16. FIG. 15 is a diagram for illustrating a primary frequency component P1 a secondary frequency component S2 and a tertiary frequency component S3 of the low-frequency control signal C3, which the map filter 142 outputs, respectively. FIG. 16 is a diagram for illustrating the low-frequency control signal C3 which is produced by synthesizing the frequency components of the respective orders shown in FIG. 15. Note that FIGS. 15 and 16 show the low-frequency control signal C3 for a cyclic pulsating signal whose frequency f is 30 Hz, and represent the maximum value so as to be equal to 1.

The low-frequency control signal C3, which the map filter 142 generates, is calculated based on following equations (4), (5) and (6). Equation (4) represents the primary frequency component P1 of the low-frequency control signal C3. This primary frequency component P1 is a rectangle-shaped wave signal, as shown in FIG. 15. Equation (5) represents the secondary frequency component S2 and tertiary frequency component S3 of the low-frequency control signal C3. The secondary frequency component S2 and tertiary frequency component S3 are sine-wave signals, as shown in FIG. 15. Moreover, Equation (6) represents the low-frequency control signal C3. The low-frequency control signal C3 is a signal which is produced by synthesizing the primary frequency component P1, a signal converted into the rectangle-shaped wave signal, and the secondary and tertiary frequency components S2 and S3, the sine-wave signals. However, note that the maximum value of the low-frequency control signal C3 is set up at $a_1$.

When k=1, $$y_{1(n)} = (a_{1(n)}/2) \cdot \sin(k\omega \cdot \Delta T \cdot n + \phi_{1(n)}) + a_{1(n)}/\text{offset} \quad \text{Equation (4):}$$

however,
when $y_{1(n)} \geqq 0$, $y_{1(n)} = a_{1(n)}$; and
when $y_{1(n)} < 0$, $y_{1(n)} = -a_1/\text{offset2}$ $a_{(n)}$: Amplitude Value (or Filter Coefficient Gain)
$\phi_{(n)}$: Phase Value (or Filter Coefficient Phase)
$\omega$: Metered Angular Frequency
$\Delta T$: Sampling Cycle
N: Sampling Number (time)
k: Frequency Order
offset and offset2: Offsets for Output Calculated Values
When k=2, 3

$$y_{k(n)} = (a_{k(n)}/2) \cdot \sin(k\omega \cdot \Delta T \cdot n + \phi_{k(n)}) + a_{k(n)}/\text{offset} \quad \text{Equation (5):}$$

$$y_{(n)} = y_{1(n)} + y_{2(n)} + y_{3(n)} \quad \text{Equation (6):}$$

however,
when $y_{(n)} \geqq a_1$, $y_{(n)} = a_1$

(8-1-3) Value of Electric Current Resulting from Low-frequency Control Signal C3 to Flow in Vibrator 17

Figure 17:
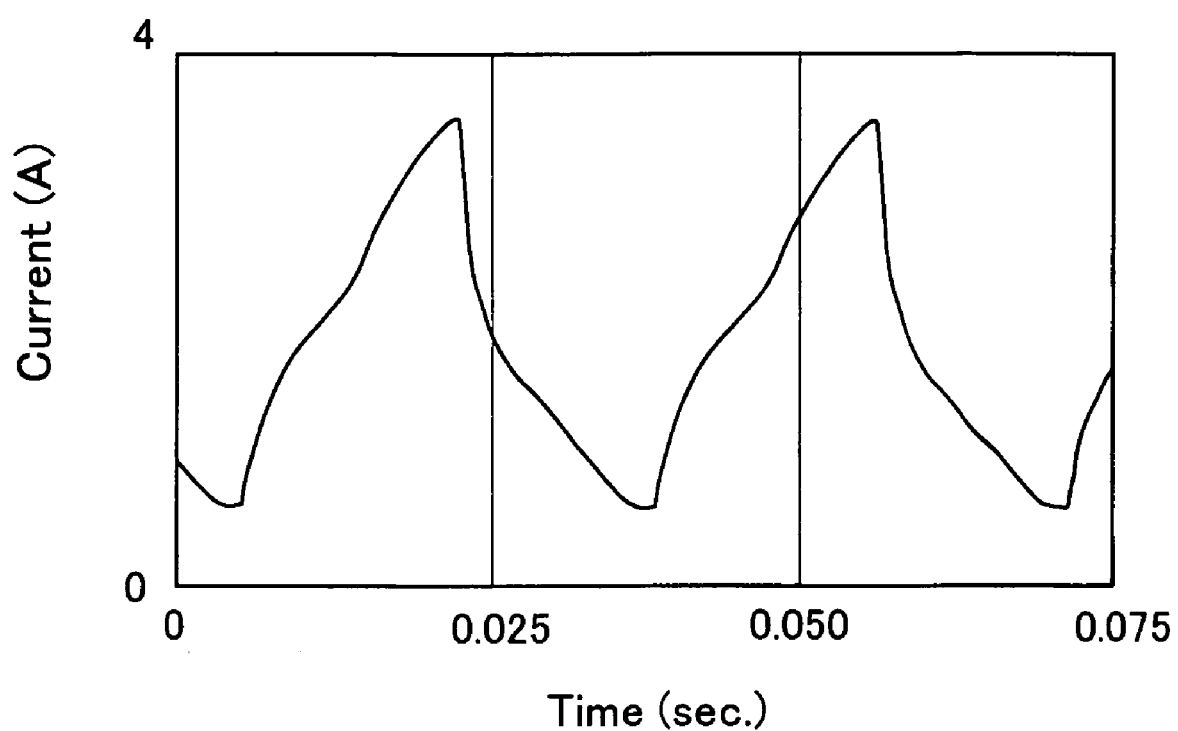
FIG. 17 is a diagram for illustrating the value of electric current, which flows in the coil of the vibrator 17 when the driver 16 is actuated based on the low-frequency control signal C3.

The value of electric current flowing in the vibrator 17 when the driver 16 is actuated based on the above-described low-frequency control signal C3 will be hereinafter described with reference to FIG. 17. FIG. 17 is a diagram for illustrating the value of the electric current. The processing operations of the driver 16 are the same as the above-described processing operations of the driver 16 according to the example. That is, in the map control mode, the driver 16 turns on the high-side switch Q1, and actuates the low-side switch Q2 by means of pulse-width modulation, when the low-frequency control signal C3 is positive. On the other hand, in the adaptive control mode, the driver 16 turns off the high-side switch Q1, and actuates the low-side switch Q2 by means of pulse-width modulation, when the low-frequency control signal C3 is negative.

Moreover, when the driver 16 is actuated based on the above-described low-frequency control signal C3, the value of the electric current flowing in the coil of the vibrator 17 appears as illustrated in FIG. 17. Specifically, the electric-current value increases when the low-frequency control signal C3 is positive, and decreases when the low-frequency control signal C3 is negative. Moreover, when the driver 16 is actuated based on the above-described low-frequency control signal C3, the value of the electric current flowing in the vibrator 17 is greater, compared with the case where the driver 16 is actuated based on the low-frequency control signal C1. That is, actuating the driver 16 based on the above-described low-frequency control signal C3 can cause the vibrator 17 to generate larger vibrating forces. In addition, when the low-frequency control signal C3 is negative, the value of the electric current flowing in the coil decreases, but does not reach zero. That is, the active vibration insulator 1 according to this modified version can inhibit the turned-on electricity supply to the vibrator 17 from being turned off. Therefore, the active vibration insulator 1 according to this modified version can suppress the generation of abnormal noises resulting from turning off the turned-on electricity supply to the vibrator 17.

(8-2) Another Actuating Signal Output by Actuating-signals Output Device 161

In the above-described example, the actuating signals are adapted to be signals which turn on the high-side switch Q1 and actuate the low-side switch Q2 by means of pulse-width modulation when the low-frequency control signal C1 and high-frequency control signal C2 are positive. The actuating signals can be adapted to be signals which actuate the high-side switch Q1 and low-side switch Q2 by means of pulse-width modulation when the low-frequency control signal C1 and high-frequency control signal C2 are positive. In this instance, a PWM signal for the high-side switch Q1 and a PWM signal for the low-side switch Q2 can actuate the high-side switch Q1 and low-side switch Q2 synchronously, or can actuate them in a dephased manner.

The actuating signals are adapted to be signals which turn off the high-side switch Q1 and actuate the low-side switch Q2 by means of pulse-width modulation when the low-frequency control signal C1 is negative in the map control mode. The actuating signals can be adapted to be signals which actuate the high-side switch Q1 by means of pulse-width modulation and turn off the low-side switch Q2 when the low-frequency control signal C1 is negative in the map control mode. In these occasions, the active vibration insulator 1 can produce the aforementioned advantages as well.

(8-3) Another Mode Switching Process by Mode Switcher 12

In the above-described example, the mode switcher 12 switches the control mode from the map control mode to the adaptive control mode, or vice versa, selectively depending on the frequency f of a specific cyclic pulsating signal alone. However, the mode switcher 12 can switch the control mode while taking not only the frequency f but also a vehicle speed into account. For example, the mode switcher 12 can switch the control mode from the adaptive control mode to the map control mode when the frequency f is low and the vehicle speed is slow, and can switch the control mode from the map control mode to the adaptive control mode when the frequency f is high and the vehicle speed is fast.

(8-4) Switching Frequency for Mode Switcher 12

In the above-described example, the frequency f of a specific cyclic pulsating signal, at which the mode switcher 12 switches the control mode from the map control mode to the adaptive control mode, or vice versa, is set up at 50 Hz. However, it is possible to change the frequency f wherever appropriate. Moreover, the frequency f can be determined while taking the natural frequencies of other vehicle component parts into consideration in addition to the natural frequencies of engine frames. In addition, it is possible to set up the frequency f, at which the mode switcher 12 switches the control mode, while giving consideration to various conditions in addition to the natural frequencies of vehicle component parts.

(8-5) Low-frequency Control Signal C1

The low-frequency control signal C1 is determined while taking the primary through tertiary frequency components of the cyclic pulsating signal whose frequency is f. However, it is possible to set up the low-frequency control signal C1 while giving consideration to much higher order frequency components. Thus, the active vibration insulator 1 can inhibit much higher vibrations from transmitting.

Having now fully described the present invention, it will be apparent to one of ordinary skill in the art that many changes and modifications can be made thereto without departing from the spirit or scope of the present invention as set forth herein including the appended claims.

What is claimed is:

1. An active vibration insulator, comprising:
   an electromagnetic actuator for generating vibrating forces by making an electric-current supply variable;
   means for generating cyclic control signals based on cyclic pulsating signals output from a vibration generating source of a vehicle, the cyclic control signals actively inhibiting a specific part of the vehicle from vibrating; and
   means for driving the electromagnetic actuator by making the electric-current supply to the electromagnetic actuator variable based on the cyclic control signals, the means comprising:
     an asymmetric half-bridge circuit comprising a high-side switch connected with a positive-terminal side of the electromagnetic actuator, and a low-side switch connected with a negative-terminal side of the electromagnetic actuator and disposed asymmetrically with respect to the high-side switch; and
     means for outputting actuating signals, the means outputting a turn-on actuating signal to one of the high-side switch and the low-side switch and outputting a pulse-width-modulated actuating signal to the other one of them based on the cyclic control signals, or outputting a pulse-width-modulated actuating signal to both of the high-side switch and the low-side switch based on the cyclic control signals, when the cyclic control signals are positive; and outputting a turn-off actuating signal to one of the high-side switch and the low-side switch and outputting a pulse-width-modulated actuating signal to the other one of them based on the cyclic control signals when the cyclic control signals are negative.

2. The active vibration insulator set forth in claim 1, wherein:
   the cyclic control signals comprise a low-frequency control signal, which is produced by synthesizing a primary frequency component and a higher-order frequency component signal with respect to the cyclic frequencies of the pulsating signals, when the frequencies of the cyclic pulsating signals are a predetermined frequency or less; and
   the cyclic control signals comprise a high-frequency control signal, which is composed of the primary frequency component alone, when the frequencies of the cyclic pulsating signals are higher than the predetermined frequency.

3. The active vibration insulator set forth in claim 2, wherein the primary frequency component of the low-frequency control signal comprises a sine-wave signal.

4. The active vibration insulator set forth in claim 2, wherein the primary frequency component of the low-frequency control signal comprises a rectangle-shaped wave signal, which is calculated based on a sine-wave signal.

5. The active vibration insulator set forth in claim 2, wherein the high-frequency control signal comprises a rectangle-shaped wave signal, which is calculated based on the primary frequency component.

6. The active vibration insulator set forth in claim 1, wherein:
   the actuating-signals outputting means outputs a turn-off actuating signal to one of the high-side switch and the low-side switch and outputs a pulse-width-modulated actuating signal to the other one of them based on the cyclic control signals when the cyclic control signals are negative and the frequencies of the cyclic pulsating signals are a predetermined frequency or less; and the actuating-signals outputting means outputs a turn-off actuating signal to the high-side switch and the low-side switch when the cyclic control signals are negative and the frequencies of the cyclic pulsating signals are higher than the predetermined frequency.

7. The active vibration insulator set forth in claim 1, wherein:

the cyclic-control-signals generating means calculates the cyclic control signals based a data map stored in advance and driving conditions of the vehicle under vibration control when the frequencies of the cyclic pulsating signals are a predetermined frequency or less; and the cyclic-control-signals generating means calculates the cyclic control signals based on an adaptive control method when the frequencies of the cyclic pulsating signals are higher than the predetermined frequency.

* * * * *